US012590473B2

(12) United States Patent
Ando et al.

(10) Patent No.: US 12,590,473 B2
(45) Date of Patent: Mar. 31, 2026

(54) VEHICLE PLATFORM

(71) Applicants: TOYOTA JIDOSHA KABUSHIKI KAISHA, Toyota (JP); DENSO CORPORATION, Kariya (JP)

(72) Inventors: Eisuke Ando, Nagoya (JP); Takehito Fujii, Anjo (JP)

(73) Assignees: TOYOTA JIDOSHA KABUSHIKI KAISHA, Toyota (JP); DENSO CORPORATION

(*) Notice: Subject to any disclaimer, the term of this patent is extended or adjusted under 35 U.S.C. 154(b) by 257 days.

(21) Appl. No.: 17/947,266

(22) Filed: Sep. 19, 2022

(65) Prior Publication Data

US 2023/0139795 A1 May 4, 2023

(30) Foreign Application Priority Data

Sep. 28, 2021 (JP) ................................ 2021-157663

(51) Int. Cl.

| | |
|---|---|
| ***E05B 77/54*** | (2014.01) |
| ***E05B 77/22*** | (2014.01) |
| ***E05B 81/72*** | (2014.01) |
| ***E05B 83/18*** | (2014.01) |

(52) U.S. Cl.

CPC .............. *E05B 77/54* (2013.01); *E05B 77/22* (2013.01); *E05B 81/72* (2013.01); *E05B 83/18* (2013.01)

(58) Field of Classification Search

CPC .......... E05B 77/54; E05B 77/22; E05B 81/72; E05B 83/18

USPC ............................................................ 701/36

See application file for complete search history.

(56) References Cited

U.S. PATENT DOCUMENTS

| | | | | |
|---|---|---|---|---|
| 11,608,082 | B1 * | 3/2023 | Anderson | B60W 60/00 |
| 2014/0169139 | A1 * | 6/2014 | Lee | G08C 17/00 367/197 |
| 2017/0044816 | A1 * | 2/2017 | Salter | B60J 5/101 |
| 2017/0074000 | A1 * | 3/2017 | Banvait | G07C 9/00571 |
| 2017/0241184 | A1 * | 8/2017 | Rust | E05F 15/73 |
| 2017/0292313 | A1 * | 10/2017 | Herman | H04W 4/80 |
| 2019/0128694 | A1 * | 5/2019 | Matsushita | G10L 13/00 |

(Continued)

FOREIGN PATENT DOCUMENTS

| | | | |
|---|---|---|---|
| CN | 103318130 A | * | 9/2013 |
| JP | 2018-132015 A | | 8/2018 |

(Continued)

OTHER PUBLICATIONS

Subaru Corporation, "2019 Forester Owner's Manual", Copyright 2018 (Year: 2018).*

(Continued)

*Primary Examiner* — Hunter B Lonsberry
*Assistant Examiner* — Helen Li
(74) *Attorney, Agent, or Firm* — Oliff PLC

(57) ABSTRACT

A body system determines whether or not entrance doors of all seats or entrance doors of rear seats are unlocked. When determination as YES is made, the body system determines whether or not a trunk operate command received by a VCIB from an ADK (ADS) indicates an "Open/Close Request" for a trunk door. When determination as YES is made, the body system determines whether or not it keeps receiving the "Open/Close Request" for one second. When determination as YES is made, the body system starts an action of the trunk door.

11 Claims, 13 Drawing Sheets

(56) References Cited

U.S. PATENT DOCUMENTS

| | | | | |
|---|---|---|---|---|
| 2019/0180233 | A1* | 6/2019 | Kadotani | G06Q 10/08345 |
| 2019/0323281 | A1* | 10/2019 | Ghannam | B60J 5/101 |
| 2023/0061499 | A1* | 3/2023 | Salter | B60R 25/305 |

FOREIGN PATENT DOCUMENTS

| | | | |
|---|---|---|---|
| JP | 2019-020985 | A | 2/2019 |
| JP | 2020-019310 | A | 2/2020 |
| JP | 2021-084566 | A | 6/2021 |
| WO | 2016/117328 | A1 | 7/2016 |

OTHER PUBLICATIONS

General Motors LLC, "2015 Chevrolet Tahoe/Suburban Owner Manual", Copyright 2015, see specifically pp. 2-19 through 2-24 (Year: 2015).*

* cited by examiner

<Trunk Operate Command>

| Value | Description | Remarks |
|---|---|---|
| 0 | No Request | |
| 1 | Open/Close Request | Action Request |
| 2–3 | Reserved | |

FIG.9

| | |
|---|---|
| #1: CREATING A DRIVING PLAN 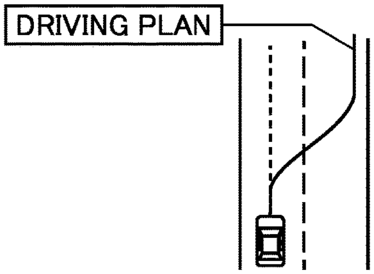  | THE ADS CREATES A DRIVING PLAN. |
| #2: EXTRACTING PHYSICAL QUANTITIES 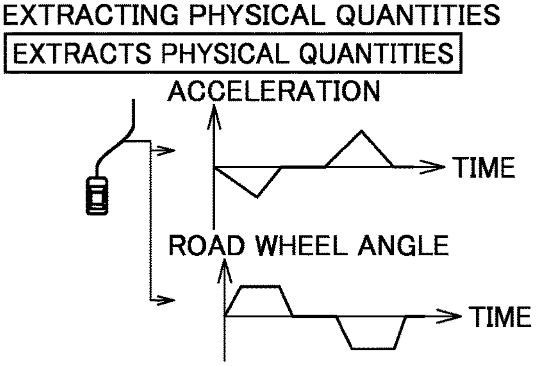  | THE ADS EXTRACTS PHYSICAL CONTROL QUANTITIES FROM THE DRIVING PLAN.<br>E.G. PHYSICAL CONTROL QUANTITIES := ACCELERATION, ROAD WHEEL ANGLE, ETC. |
| #3: SPLIT OF PHYSICAL QUANTITIES 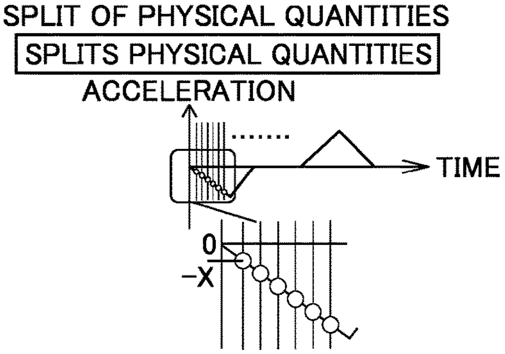  | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR 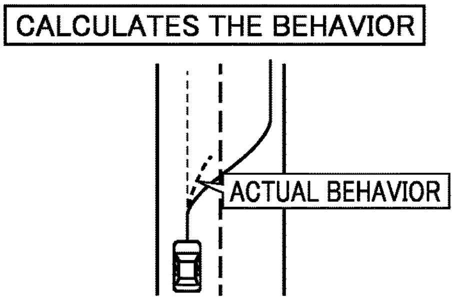  | THE ADS CALCULATES THE VEHICLE BEHAVIOR, AND RECREATES A DRIVING PLAN TO WHICH THE VEHICLE BEHAVIOR IS REFLECTED |

VEHICLE PLATFORM

This nonprovisional application is based on Japanese Patent Application No. 2021-157663 filed with the Japan Patent Office on Sep. 28, 2021, the entire contents of which are hereby incorporated by reference.

BACKGROUND

Field

The present disclosure relates to a vehicle platform configured to allow autonomous driving.

Description of the Background Art

A technique for autonomous driving of a vehicle has recently been developed. For example, Japanese Patent Laying-Open No. 2018-132015 discloses a vehicle including a motive power system that manages motive power of a vehicle in a centralized manner, a power supply system that manages power supply to various vehicle-mounted devices in a centralized manner, and an autonomous driving system that carries out autonomous driving control of the vehicle in a centralized manner.

SUMMARY

During autonomous driving, an opening/closing action of a trunk door (back door) may automatically be taken in accordance with a command from an autonomous driving system. In this case, the action of the trunk door at timing unexpected by a user of a vehicle is undesirable.

The present disclosure was made to solve the problem above, and an object thereof is to suppress an action of a trunk door at timing unexpected by a user during autonomous driving.

A vehicle platform according to one aspect of this disclosure is a vehicle platform on which an autonomous driving system is mountable. The vehicle platform includes a vehicle and a vehicle control interface box that interfaces between the vehicle and the autonomous driving system. The vehicle includes an entrance door and a trunk door. While the entrance door is unlocked, the vehicle accepts a trunk operate command that requests an action of the trunk door received by the vehicle control interface box from the autonomous driving system.

A vehicle platform according to another aspect of this disclosure includes an autonomous driving system that creates a driving plan, a vehicle that carries out vehicle control in accordance with a command from the autonomous driving system, and a vehicle control interface box that interfaces between the vehicle and the autonomous driving system. The vehicle includes an entrance door and a trunk door. While the entrance door is unlocked, the vehicle accepts a trunk operate command that requests an action of the trunk door received by the vehicle control interface box from the autonomous driving system.

While the entrance door is unlocked, a user can anticipate that the trunk door may be activated. According to the configuration, while the entrance door is unlocked, the vehicle accepts the trunk operate command. Therefore, the trunk door can be activated at timing when the user can anticipate an action of the trunk door.

In one embodiment, while the entrance door of a rear seat is unlocked, the vehicle accepts the trunk operate command.

While the entrance door of the rear seat is unlocked, the user can further anticipate that the trunk door may be activated. According to the configuration, since the vehicle accepts the trunk operate command while the entrance door of the rear seat is unlocked, the trunk door can be activated at timing when the user can anticipate an action of the trunk door.

In one embodiment, the trunk operate command includes a first request that requests an opening/closing action of the trunk door. When the vehicle keeps accepting the first request for one second, the vehicle activates the trunk door.

According to the configuration, by setting continued acceptance of the first request for one second as a condition for the action of the trunk door, an erroneous action of the trunk door due to noise or the like can be suppressed.

In one embodiment, the trunk operate command includes a second request that indicates No request. When the vehicle accepts the second request while the trunk door is in action, the vehicle allows a continued action of the trunk door.

According to the configuration, the trunk door can appropriately be activated.

In one embodiment, when the vehicle accepts the first request after the vehicle accepts the second request while the trunk door is in action, the vehicle stops the action of the trunk door.

According to the configuration, the trunk door can appropriately be activated.

In one embodiment, when the vehicle stops the action of the trunk door and then when the vehicle activates again the trunk door in accordance with the trunk operate command, the vehicle controls the trunk door to take an action reverse to the action before stop.

When the stopped trunk door is activated again, an action reverse to the action before stop is highly likely desired. According to the configuration, when the trunk door is activated again, it is controlled to take an action reverse to the action before stop, and hence convenience of the user can be enhanced.

In one embodiment, the autonomous driving system transmits the first request until the trunk door is fully opened or closed.

According to the configuration, end of a process with the trunk door being in a state other than a fully opened or closed state can be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a diagram showing a typical workflow in the ADS.

DESCRIPTION OF THE PREFERRED EMBODIMENTS

Figure 1:
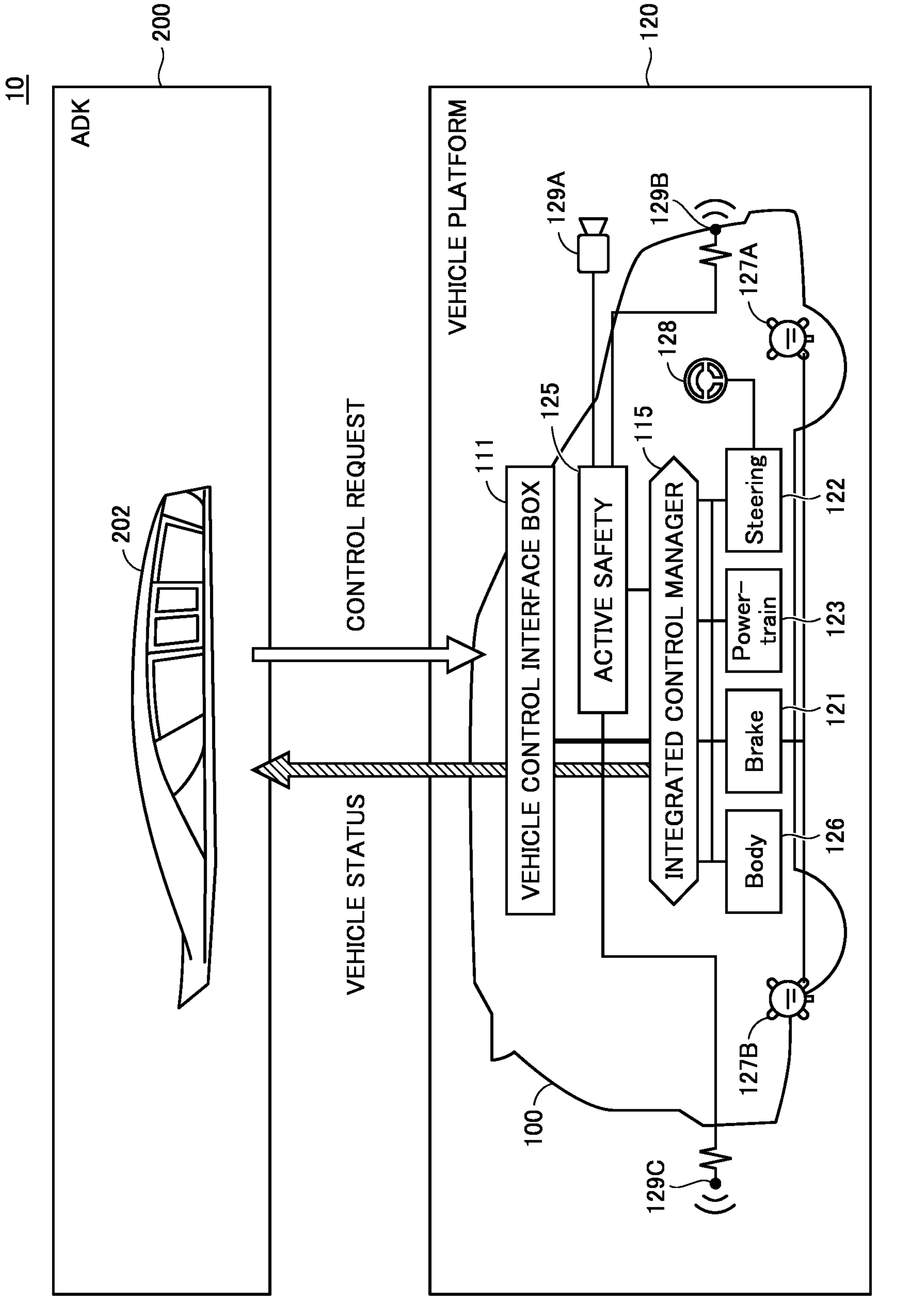
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

<Overall Configuration>

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 is configured as being attachable to (mountable on) VP 120. ADK 200 and VP 120 are configured to communicate with each other through a vehicle control interface box 111 (which will be described later) mounted on VP 120.

VP 120 can carry out autonomous driving in accordance with control requests (commands) from ADK 200. Though FIG. 1 shows VP 120 and ADK 200 at positions distant from each other, ADK 200 is actually attached to a rooftop or the like of a base vehicle 100 (which will be described later) included in VP 120. ADK 200 can also be removed from VP 120. While ADK 200 is not attached, VP 120 can travel by driving by a user. In this case, VP 120 carries out travel control (travel control in accordance with an operation by a user) in a manual mode.

ADK 200 includes an autonomous driving system (which is denoted as "ADS" below) 202 for autonomous driving of vehicle 10. For example, ADS 202 creates a driving plan of vehicle 10. Then, ADS 202 outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal. Then, ADS 202 has the received vehicle status reflected on creation of the driving plan. A detailed configuration of ADS 202 will be described later.

VP 120 includes base vehicle 100 and vehicle control interface box (which is denoted as "VCIB" below) 111.

Base vehicle 100 carries out various types of vehicle control in accordance with a control request from ADK 200 (ADS 202). Base vehicle 100 includes various systems and various sensors for controlling the vehicle. Specifically, base vehicle 100 includes an integrated control manager 115, a brake system 121, a steering system 122, a powertrain system 123, an active safety system 125, a body system 126, wheel speed sensors 127A and 127B, a pinion angle sensor 128, a camera 129A, and radar sensors 129B and 129C.

Integrated control manager 115 includes a processor and a memory, and integrally controls the systems (brake system 121, steering system 122, powertrain system 123, active safety system 125, and body system 126) involved with operations of the vehicle.

Brake system 121 is configured to control a braking apparatus provided in each wheel. The braking apparatus includes, for example, a disc brake system (not shown) that is operated with a hydraulic pressure regulated by an actuator.

Wheel speed sensors 127A and 127B are connected to brake system 121. Wheel speed sensor 127A detects a rotation speed of a front wheel and outputs a detection value thereof to brake system 121. Wheel speed sensor 127B detects a rotation speed of a rear wheel and outputs a detection value thereof to brake system 121.

Brake system 121 generates a braking command to a braking apparatus in accordance with a prescribed control request outputted from ADK 200 through VCIB 111 and integrated control manager 115. Brake system 121 then controls the braking apparatus based on the generated braking command. Integrated control manager 115 can calculate a speed of the vehicle (vehicle speed) based on the rotation speed of each wheel.

Steering system 122 is configured to control a steering angle of a steering wheel of the vehicle with a steering apparatus. The steering apparatus includes, for example, rack-and-pinion electric power steering (EPS) that allows adjustment of a steering angle by an actuator.

Pinion angle sensor 128 is connected to steering system 122. Pinion angle sensor 128 detects an angle of rotation (a pinion angle) of a pinion gear coupled to a rotation shaft of the actuator included in the steering apparatus and outputs a detection value thereof to steering system 122.

Steering system 122 generates a steering command to the steering apparatus in accordance with a prescribed control request outputted from ADK 200 through VCIB 111 and integrated control manager 115. Then, steering system 122 controls the steering apparatus based on the generated steering command.

Powertrain system 123 controls an electric parking brake (EPB) system provided in at least one of a plurality of wheels, a parking lock (P-Lock) system provided in a transmission of base vehicle 100, and a propulsion system including a shift apparatus for selecting a shift range. A detailed configuration of powertrain system 123 will be described later with reference to FIG. 2.

Active safety system 125 detects an obstacle (a pedestrian, a bicycle, a parked vehicle, a utility pole, or the like) in front or in the rear of the vehicle with the use of camera 129A and radar sensors 129B and 129C. Active safety system 125 determines whether or not vehicle 10 may collide with the obstacle based on a distance between vehicle 10 and the obstacle and a direction of movement of vehicle 10. Then, when active safety system 125 determines that there is possibility of collision, it outputs a braking command to brake system 121 through integrated control manager 115 so as to increase braking force of the vehicle.

Body system 126 is configured to control, for example, various devices such as a direction indicator, a headlight, a hazard light, a horn, a front wiper, and a rear wiper (none of which is shown), depending on a state or an environment of travel of vehicle 10. Body system 126 controls the various devices above in accordance with a prescribed control request outputted from ADK 200 through VCIB 111 and integrated control manager 115. Body system 126 is configured to control an opening and closing apparatus (which will be described later) that activates the trunk door (back door). Body system 126 controls the opening and closing apparatus to activate the trunk door in accordance with a prescribed control request outputted from ADK 200 through VCIB 111 and integrated control manager 115.

VCIB 111 is configured to communicate with ADS 202 of ADK 200 over a controller area network (CAN). VCIB 111 receives various control requests from ADS 202 or outputs a status of VP 120 to ADS 202 by executing a prescribed API defined for each communicated signal. When VCIB 111 receives the control request from ADS 202, it outputs a control command corresponding to the control request to a system corresponding to the control command through integrated control manager 115. VCIB 111 obtains various types of information on base vehicle 100 from each system through integrated control manager 115 and outputs the status of base vehicle 100 as the vehicle status to ADS 202.

Vehicle 10 may be adopted as one of features of a mobility as a service (MaaS) system. The MaaS system further includes, for example, a data server and a mobility service platform (MSPF) (neither of which is shown), in addition to vehicle 10.

The MSPF is an integrated platform to which various mobility services are connected. Autonomous driving related mobility services are connected to the MSPF. In addition to the autonomous driving related mobility services, mobility services provided by a ride-share company, a car-sharing company, a rent-a-car company, a taxi company, and an insurance company may be connected to the MSPF. Various mobility services including mobility services can use various functions provided by the MSPF by using APIs published on the MSPF, depending on service contents.

VP 120 further includes a data communication module (DCM) (not shown) as a communication interface (I/F) to wirelessly communicate with a data server of the MaaS system. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF publishes APIs for using various types of data on vehicle statuses and vehicle control necessary for development of the ADK. Various mobility services can use various functions provided by the MSPF depending on service contents, by using the APIs published on the MSPF. For example, the autonomous driving related mobility services can obtain operation control data of an autonomous driving vehicle that communicates with the data server or information stored in the data server from the MSPF by using the APIs published on the MSPF. The autonomous driving related mobility services can transmit data for managing an autonomous driving vehicle including vehicle 10 to the MSPF by using the API.

Figure 2:
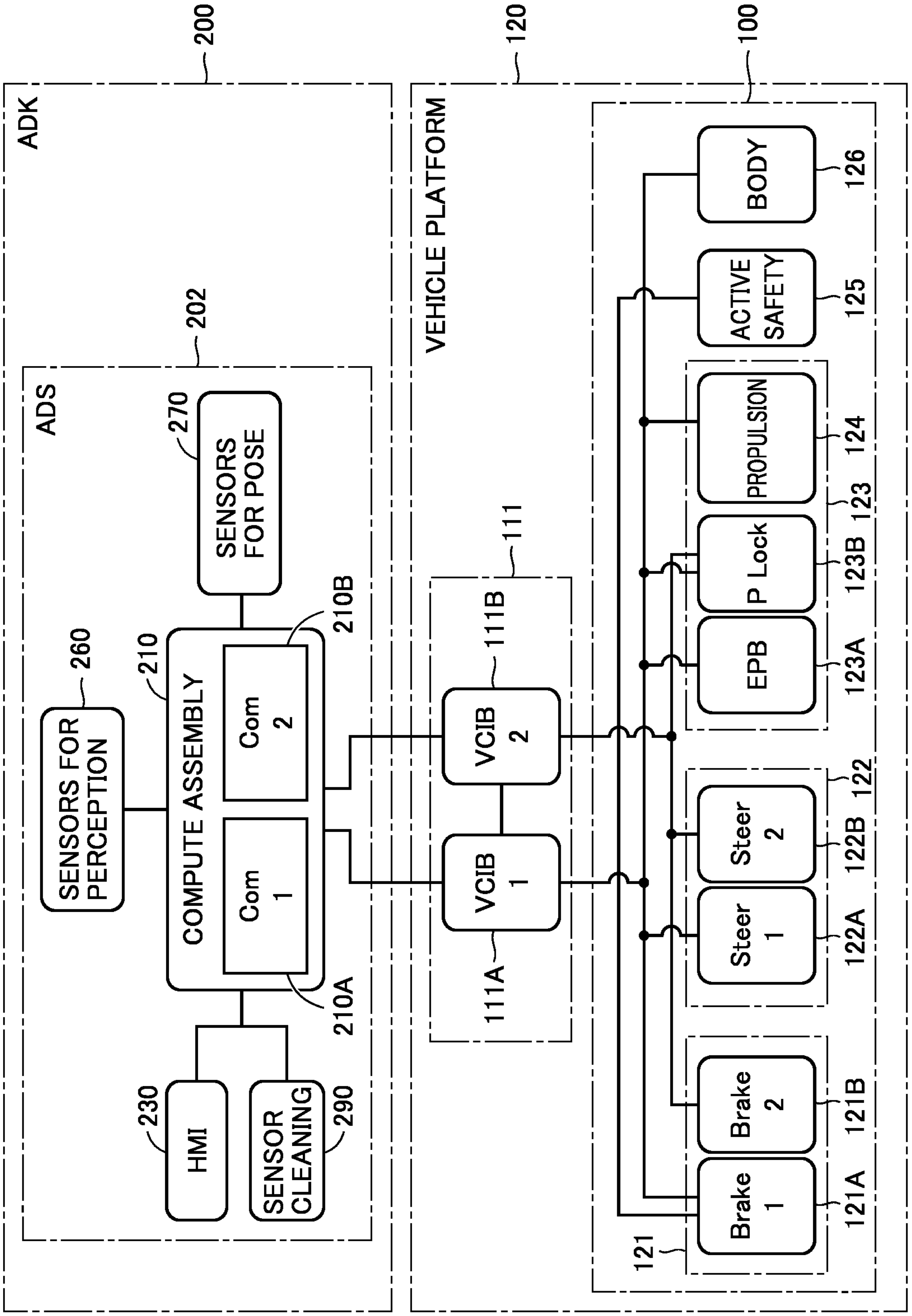
FIG. 2 is a diagram showing in further detail, a configuration of an ADK (ADS) and a VP shown in FIG. 1.

FIG. 2 is a diagram showing in further detail, a configuration of ADK 200 (ADS 202) and VP 120 shown in FIG. 1. Referring to FIG. 2, ADS 202 of ADK 200 includes a compute assembly 210, a human machine interface (HMI) 230, sensors for perception 260, sensors for pose 270, and a sensor cleaning 290.

Compute assembly 210 includes communication modules 210A and 210B. Communication modules 210A and 210B are configured to communicate with VCIB 111. During autonomous driving of vehicle 10, compute assembly 210 obtains an environment around the vehicle and a pose, a behavior, and a position of vehicle 10 from various sensors (which will be described later), and obtains a vehicle status from VP 120 through VCIB 111 and sets a next operation (acceleration, deceleration, or turning) of vehicle 10. Then, compute assembly 210 outputs various commands for realizing a set next operation to VCIB 111 in VP 120.

HMI 230 presents information to a user and accepts an operation by the user during autonomous driving, during driving requiring an operation by a user, or at the time of transition between autonomous driving and driving requiring an operation by the user. HMI 230 is constructed to be connected to an input and output apparatus (not shown) such as a touch panel display provided in VP 120.

Sensors for perception 260 are sensors that perceive an environment around the vehicle. Sensors for perception 260 include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting the front of vehicle 10. As a result of image processing by artificial intelligence (AI) or an image processing processor onto images or video images shot by the camera, another vehicle, an obstacle, or a human in front of vehicle 10 can be recognized. Information obtained by sensors for perception 260 is outputted to compute assembly 210.

Sensors for pose 270 are sensors that detect a pose, a behavior, or a position of vehicle 10. Sensors for pose 270 include, for example, an inertial measurement unit (IMU) and a global positioning system (GPS).

The IMU detects, for example, an acceleration in a front-rear direction, a lateral direction, and a vertical direction of vehicle 10 and an angular speed in a roll direction, a pitch direction, and a yaw direction of vehicle 10. The GPS detects a position of vehicle 10 based on information received from a plurality of GPS satellites that orbit the Earth. Information obtained by sensors for pose 270 is outputted to compute assembly 210.

Sensor cleaning 290 removes soiling attached to various sensors. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIBs 111A and 111B includes an electronic control unit (ECU). The ECU includes a processor such as a not-shown central processing unit (CPU) and a memory (a read only memory (ROM) and a random access memory (RAM)). A program executable by the processor is stored in the ROM. The processor performs various types of processing in accordance with the program stored in the ROM.

VCIBs 111A and 111B are communicatively connected to communication modules 210A and 210B of ADS 202, respectively. VCIB 111A and VCIB 111B are also communicatively connected to each other. Though VCIB 111B is equivalent in function to VCIB 111A, it is partially different in a plurality of systems connected thereto that make up VP 120.

VCIBs 111A and 111B each relay control requests and vehicle statuses between ADS 202 and VP 120. More specific description will be given representatively for VCIB 111A. VCIB 111A receives various control requests outputted from ADS 202 in accordance with an API defined for each control request. Then, VCIB 111A generates a command corresponding to the received control request and outputs the command to a system of base vehicle 100 corresponding to the control request. In the present embodiment, the control request received from ADS 202 includes a trunk operate command indicating an opening/closing action of a trunk door (back door) of base vehicle 100.

VCIB 111A receives vehicle information provided from each system of VP 120 and transmits information indicating the vehicle status of VP 120 to ADS 202 in accordance with an API defined for each vehicle status. The information indicating the vehicle status to be transmitted to ADS 202 may be information identical to the vehicle information provided from each system of VP 120 or may be information extracted from the vehicle information to be used for processing performed by ADS 202.

As VCIBs 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnecting a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 through a communication bus. VCIB 111B is communicatively connected to brake system 121B, steering system 122B, and P-Lock system 123B through a communication bus.

Brake systems 121A and 121B are configured to control a plurality of braking apparatuses provided in wheels. Brake system 121B may be equivalent in function to brake system 121A, or one of brake systems 121A and 121B may be configured to independently control braking force of each wheel during travel of the vehicle and the other thereof may be configured to control braking force such that equal braking force is generated in the wheels during travel of the vehicle.

Brake systems 121A and 121B each generate a braking command to the braking apparatus in accordance with a control request received from ADS 202 through VCIB 111. For example, brake systems 121A and 121B control the braking apparatus based on a braking command generated in one of the brake systems, and when a failure occurs in that brake system, the braking apparatus is controlled based on a braking command generated in the other brake system.

Steering systems 122A and 122B are configured to control a steering angle of a steering wheel of vehicle 10 with a steering apparatus. Steering system 122B is similar in function to steering system 122A.

Steering systems 122A and 122B each generate a steering command to the steering apparatus in accordance with a control request received from ADS 202 through VCIB 111. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB is provided separately from the braking apparatus, and fixes a wheel by an operation of an actuator. The EPB, for example, activates with an actuator, a drum brake for a parking brake provided in at least one of a plurality of wheels to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request received from ADS 202 through VCIB 111.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of base vehicle 100. Rotation of an output shaft of the transmission is thus fixed and the wheel is fixed.

P-Lock system 123B controls the P-Lock apparatus in accordance with a control request received from ADS 202 through VCIB 111. When the control request from ADS 202 includes a request to set the shift range to a parking range (P range), P-Lock system 123B activates the P-Lock apparatus, and when the control request includes a request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (N range), a forward travel range (D range), and a rearward travel range (R range). The drive source includes, for example, a motor generator and an engine.

Propulsion system 124 controls the shift apparatus and the drive source in accordance with a control request received from ADS 202 through VCIB 111.

Active safety system 125 is communicatively connected to brake system 121A. As described above, active safety system 125 detects an obstacle (an obstacle or a human) in front of the vehicle by using camera 129A and radar sensor 129B, and when it determines that there is possibility of collision based on a distance to the obstacle, it outputs a braking command to brake system 121A so as to increase braking force.

Body system 126 controls various devices in accordance with a control request (control command) received from ADS 202 through VCIB 111. The various devices include, for example, a direction indicator, a headlight, a hazard light, a horn, a front wiper, and a rear wiper. In addition, the various devices include an opening and closing apparatus (FIG. 3) for the trunk door. In other words, body system 126 controls the opening and closing apparatus for the trunk door in accordance with a control request received from ADS 202 through VCIB 111 and integrated control manager 115.

For example, when an autonomous mode is selected as the autonomous state by an operation by the user onto HMI 230 in vehicle 10, autonomous driving is carried out. During autonomous driving, ADS 202 initially creates a driving plan as described above. Examples of the driving plan include a plan to continue straight travel, a plan to turn left/right at a prescribed intersection on a predetermined travel path, and a plan to change a travel lane.

ADS 202 calculates a controllable physical quantity (an acceleration, a deceleration, and a wheel steer angle) necessary for operations of vehicle 10 in accordance with the created driving plan. ADS 202 splits the physical quantity for each execution cycle time of the API. ADS 202 outputs a control request representing the split physical quantity to VCIB 111 by means of the API. Furthermore, ADS 202 obtains a vehicle status (an actual direction of movement of the vehicle and a state of fixation of the vehicle) from VP 120 and creates again the driving plan on which the obtained vehicle status is reflected. ADS 202 thus allows autonomous driving of vehicle 10.

Figure 3:
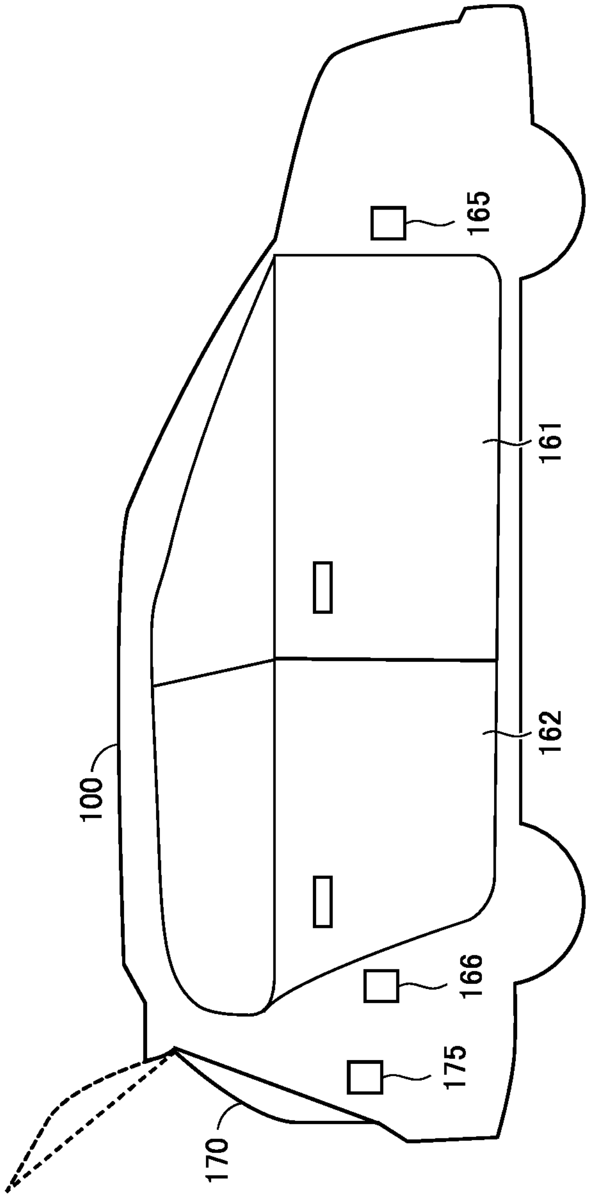
FIG. 3 is a diagram schematically showing a side view of a base vehicle.

FIG. 3 is a diagram schematically showing a side view of base vehicle 100. Base vehicle 100 includes a front seat door 161, a rear seat door 162, a front seat door locking apparatus 165, a rear seat door locking apparatus 166, a trunk door (back door) 170, and an opening and closing apparatus 175.

Front seat door locking apparatus 165 is configured to switch front seat door 161 between a locked state and an unlocked state. Rear seat door locking apparatus 166 is configured to switch rear seat door 162 between the locked state and the unlocked state. Front seat door locking apparatus 165 and rear seat door locking apparatus 166 are activated in accordance with a control signal from body system 126.

Trunk door (back door) 170 is provided as a back door of base vehicle 100. Trunk door 170 is provided with opening and closing apparatus 175. Opening and closing apparatus 175 includes, for example, an actuator, and opens and closes trunk door 170 in accordance with a control signal from body system 126. FIG. 3 shows a fully closed state of trunk door 170 with a solid line. FIG. 3 shows a fully opened state of trunk door 170 with a dashed line.

<Opening and Closing of Trunk Door>

As described above, the control request received by VCIB 111 from ADS 202 includes a trunk operate command that requests an opening/closing action of trunk door 170 of base vehicle 100. The trunk operate command is converted to a corresponding control command by VCIB 111 and sent to body system 126 through integrated control manager 115. Body system 126 controls opening and closing apparatus 175 to activate trunk door 170 in accordance with the trunk operate command (control command).

Figures 4, 5:
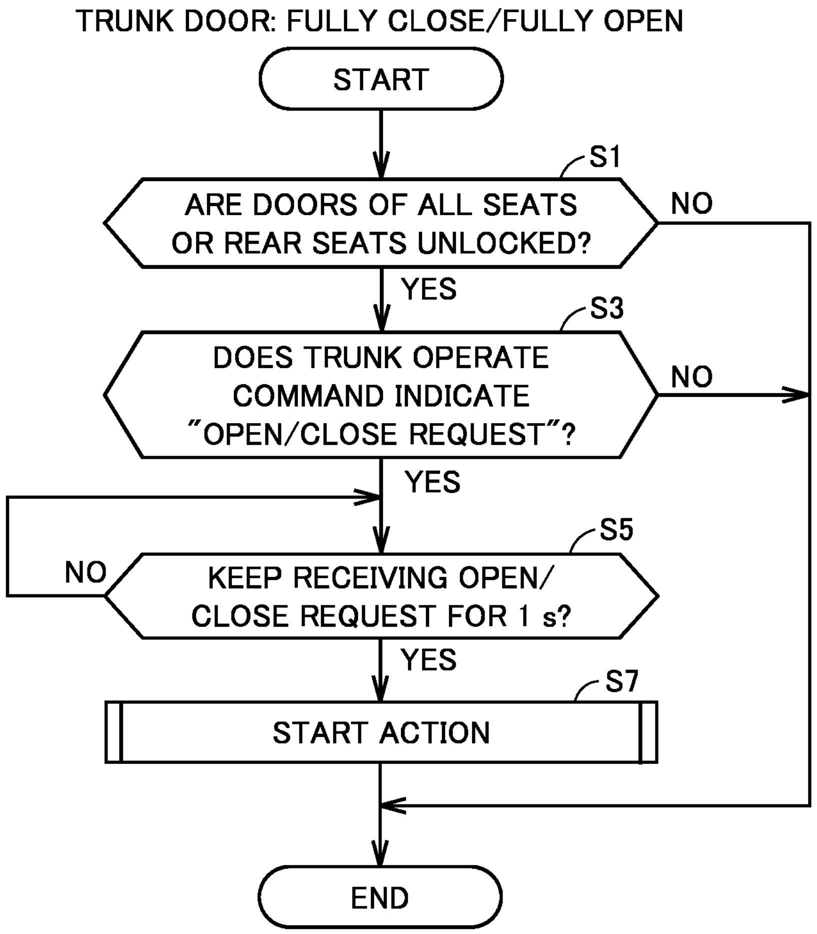
FIG. 4 is a diagram for illustrating a trunk operate command.
FIG. 5 is a flowchart showing a procedure in processing relating to an opening/closing action of a trunk door.

FIG. 4 is a diagram for illustrating the trunk operate command. FIG. 4 shows a value (Value) that the trunk operate command can take, description (Description) thereof, and remarks (Remarks).

The trunk operate command takes any one value among 0, 1, 2, and 3. The value 0 represents "No request." Though detailed description will be given later, the value 0 is set when a current action is maintained (continued). The value 1 represents "Open/Close Request." The Open/Close Request is a request for an action of trunk door 170 (opening and closing apparatus 175). The values 2 and 3 represent "Reserve". Though the values 2 and 3 are not used in the present embodiment, they can also be set and used as appropriate.

When VCIB 111 receives the trunk operate command from ADK 200 (ADS 202), it generates a control command corresponding to the value indicated in the trunk operate command and outputs the control command to base vehicle 100. Integrated control manager 115 of base vehicle 100 outputs the control command received from VCIB 111 to body system 126. When the trunk operate command indicates the value 0, VCIB 111 generates the control command indicating "No request" and outputs the control command to body system 126. When a trunk door request indicates the value 1, VCIB 111 generates a control command indicating "Open/Close Request" and outputs the control command to body system 126. Specifically, the control command outputted from VCIB 111 is provided to body system 126 through integrated control manager 115.

While doors of all seats of vehicle 10 are unlocked or the doors of rear seats of vehicle 10 are unlocked, body system 126 accepts the trunk operate command (control command). In other words, while at least the doors of the rear seats are unlocked, body system 126 accepts the trunk operate command (control command). Unless the doors of the rear seats are unlocked, body system 126 does not accept the trunk operate command (control command).

When the accepted trunk operate command indicates "No request," body system 126 maintains (continues) a current action. Specifically, when body system 126 accepts the trunk operate command indicating "No request" while trunk door 170 is fully closed or opened, it maintains that state of trunk door 170 (the fully closed or opened state) without activating opening and closing apparatus 175.

When body system 126 accepts the trunk operate command indicating "Open/Close Request" while trunk door 170 is fully closed or opened, it controls opening and closing apparatus 175 such that trunk door 170 makes transition to a state reverse to the current state thereof. Specifically, for example, when body system 126 accepts the trunk operate command indicating "Open/Close Request" while trunk door 170 is fully closed, it controls opening and closing apparatus 175 such that trunk door 170 makes transition to the fully opened state. For example, when body system 126 accepts the trunk operate command indicating "Open/Close Request" while trunk door 170 is fully opened, it controls opening and closing apparatus 175 such that trunk door 170 makes transition to the fully closed state. When body system 126 keeps receiving the trunk operate command indicating the open/close request (an action request) for one second, it starts an action of trunk door 170 (opening and closing apparatus 175).

When ADK 200 (ADS 202) outputs the trunk operate command for the first time, it keeps outputting the trunk operate command until trunk door 170 is fully opened or closed.

Even when ADK 200 requests the trunk operate command indicating "No request" while an action to open or close trunk door 170 is being taken, body system 126 controls opening and closing apparatus 175 to allow the action (an opening action or a closing action) of trunk door 170 to continue until trunk door 170 is fully opened or closed. In other words, even when the trunk operate command is changed from "Open/Close Request" to "No request" during an opening action or a closing action of trunk door 170, body system 126 allows the action (the opening action or the closing action) of trunk door 170 to continue. More specifically, even when the trunk operate command is changed from "Open/Close Request" to "No request" during the opening action of trunk door 170, body system 126 allows the opening action of trunk door 170 to continue. Even when the trunk operate command is changed from "Open/Close Request" to "No request" during the closing action of trunk door 170, body system 126 allows the closing action of trunk door 170 to continue.

When the trunk operate command is changed from "Open/Close Request" to "No request" during the opening action or the closing action of trunk door 170 and thereafter the trunk operate command is further changed from "No request" to "Open/Close Request," body system 126 controls opening and closing apparatus 175 to suspend the action of trunk door 170.

When ADK 200 (ADS 202) suspends the action of trunk door 170, it changes the trunk operate command, for example, to "No request."

When body system 126 suspends the action of trunk door 170 and then it activates again trunk door 170, it controls trunk door 170 to take a reverse action. Specifically, when body system 126 keeps accepting the trunk operate command indicating "Open/Close Request" for one second while the action of trunk door 170 remains stopped, body system 126 controls opening and closing apparatus 175 to take an action reverse to the action before the action of trunk door 170 is stopped (a reverse action). More specifically, when the action of trunk door 170 before stop of the action was the opening action, body system 126 controls opening and closing apparatus 175 such that trunk door 170 takes the closing action as the reverse action. When the action of trunk door 170 before stop of the action was the closing action, body system 126 controls opening and closing apparatus 175 such that trunk door 170 takes the opening action as the reverse action.

FIG. 5 is a flowchart showing a procedure in processing relating to an opening/closing action of trunk door 170. Processing in the flowchart in FIG. 5 is started by body system 126 when body system 126 receives a trunk operate command (control command) while trunk door 170 is fully closed or opened. Though processing in the flowchart in FIG. 5 is described as being performed by software processing by body system 126, a part or the entirety thereof may be performed by hardware (electric circuitry) made in body system 126.

In S1, body system 126 determines whether or not doors of all seats or doors of the rear seats are unlocked. In other words, body system 126 determines whether or not at least the doors of the rear seats are unlocked. Unless the doors of the rear seats are unlocked (NO in S1), body system 126 does not accept the trunk operate command and the process ends without activation of trunk door 170. When at least the doors of the rear seats are unlocked (YES in S1), body system 126 has the process proceed to S3.

In S3, body system 126 accepts the trunk operate command. Then, body system 126 determines whether or not the accepted trunk operate command indicates "Open/Close Request." Specifically, body system 126 determines contents of the trunk operate command based on the control command from VCIB 111 received through integrated control manager 115. In other words, body system 126 determines whether or not the trunk operate command received by VCIB 111 from ADS 202 indicates "Open/Close Request" based on the control command from VCIB 111. Unless the trunk operate command is "Open/Close Request" (NO in S3), body system 126 quits the process without activating trunk door 170 (opening and closing apparatus 175). In other words, when the trunk operate command indicates "No request," body system 126 quits the process without activating trunk door 170. When the trunk operate command indicates "Open/Close Request" (YES in S3), body system 126 has the process proceed to S5.

In S5, body system 126 determines whether or not it keeps receiving "Open/Close Request" for one second. Unless body system 126 keeps receiving "Open/Close Request" for one second (NO in S5), it waits for reception of "Open/Close Request" continuously for one second. When body system 126 keeps receiving "Open/Close Request" for one second (YES in S5), body system 126 has the process proceed to S7. When the trunk operate command is lost before body system 126 keeps receiving "Open/Close Request" for one second, the process may end.

In S7, body system 126 controls opening and closing apparatus 175 in accordance with a state of trunk door 170. Details of processing in S7 will be described with reference to FIG. 6.

Figure 6:
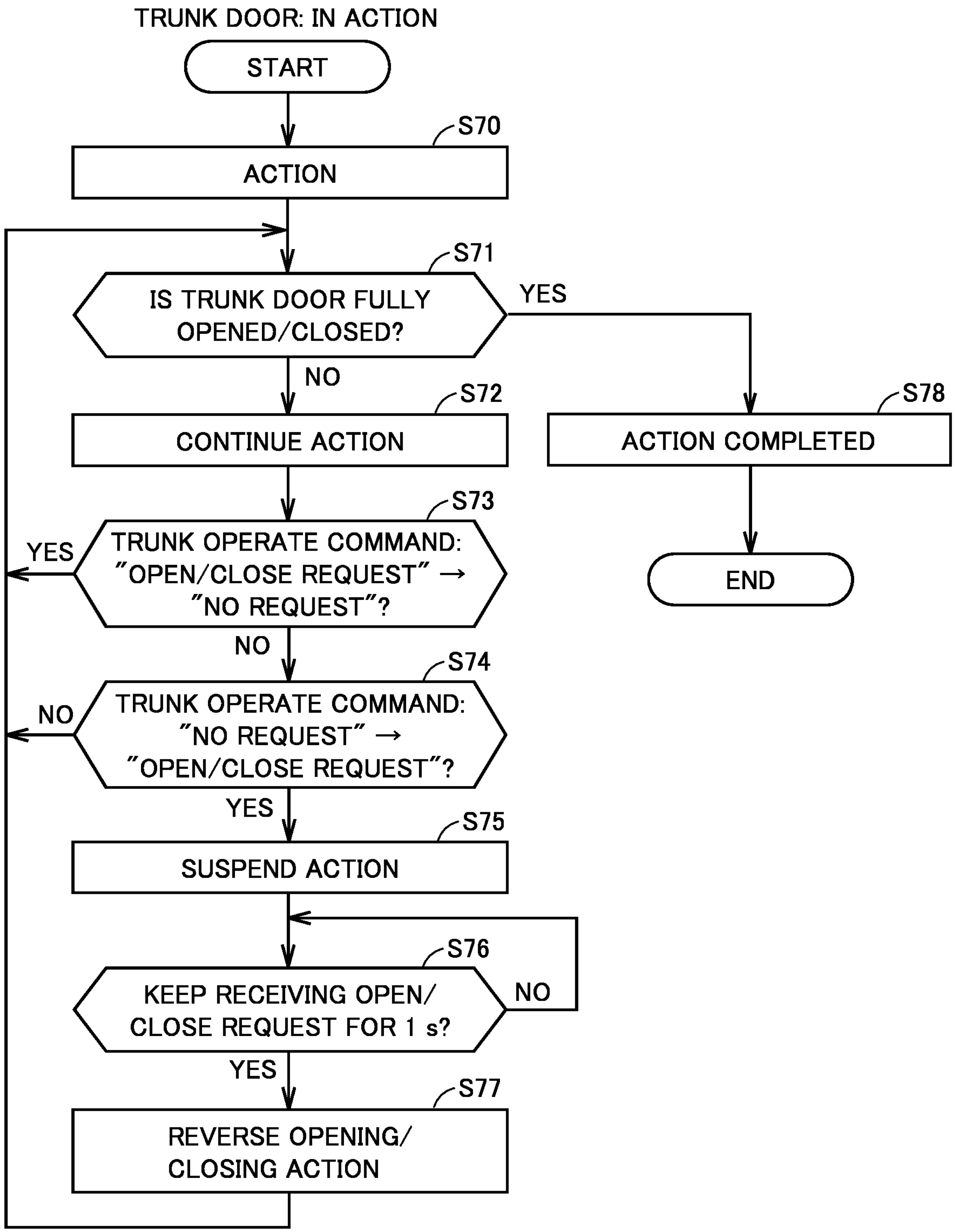
FIG. 6 is a flowchart showing a procedure in processing performed while the trunk door is in action.

FIG. 6 is a flowchart showing a procedure in processing performed while trunk door 170 is in action.

In S70, body system 126 starts an action of trunk door 170. Specifically, when trunk door 170 is in the fully closed state before start of the action, body system 126 controls opening and closing apparatus 175 to fully open trunk door 170. When trunk door 170 is in the fully opened state before start of the action, body system 126 controls opening and closing apparatus 175 to fully close trunk door 170.

In S71, body system 126 determines whether or not trunk door 170 has fully been opened or closed. Specifically, when body system 126 controls opening and closing apparatus 175 to fully open trunk door 170, it determines whether or not trunk door 170 has fully been opened (opening and closing apparatus 175 has moved to a fully opened position). When body system 126 controls opening and closing apparatus 175 to fully close trunk door 170, it determines whether or not trunk door 170 has fully been closed (opening and closing apparatus 175 has moved to a fully closed position). When body system 126 determines that trunk door 170 has not fully been opened or closed (NO in S71), it has the process proceed to S72. When body system 126 determines that trunk door 170 has fully been opened or closed (YES in S71), it has the process proceed to S78.

In S72, body system 126 controls opening and closing apparatus 175 to have the action of trunk door 170 continue.

In S73, body system 126 determines whether or not the trunk operate command has been changed from "Open/Close Request" to "No request." Body system 126 determines contents in the trunk operate command based on the control command from VCIB 111 received through integrated control manager 115. When body system 126 determines that the trunk operate command has been changed from "Open/Close Request" to "No request" (YES in S73), body system 126 has the process return to S71 and has the action of trunk door 170 continue. When body system 126 determines that the trunk operate command has not been changed from "Open/Close Request" to "No request" (NO in S73), it has the process proceed to S74.

In S74, body system 126 determines whether or not the trunk operate command has been changed from "No request" to "Open/Close Request." When body system 126 determines that the trunk operate command has not been changed from "No request" to "Open/Close Request" (NO in S74), that is, when body system 126 keeps receiving "Open/Close Request," it has the process return to S71 and has the action of trunk door 170 continue. When body system 126 determines that the trunk operate command has been changed from "No request" to "Open/Close Request" (YES in S74), it has the process proceed to S75.

In S75, body system 126 controls opening and closing apparatus 175 to suspend the action of trunk door 170. When ADS 202 suspends the action of trunk door 170, it outputs, for example, the trunk operate command indicating "No request."

In S76, body system 126 determines whether or not it keeps receiving the trunk operate command indicating "Open/Close Request" for one second. When body system 126 does not keep receiving the trunk operate command indicating "Open/Close Request" for one second (NO in S76), it continues suspension of trunk door 170. When body system 126 keeps receiving the trunk operate command indicating "Open/Close Request" for one second (YES in S76), it has the process proceed to S77.

In S77, body system 126 controls opening and closing apparatus 175 such that trunk door 170 takes an action (a reverse action) reverse to the action before stop of the action. Then, body system 126 has the process return to S71.

In S78, body system 126 quits control of opening and closing apparatus 175 as a result of trunk door 170 having been fully opened or closed, and completes the action of trunk door 170. In this case, body system 126 or integrated control manager 115 may provide a signal indicating that trunk door 170 has fully been opened or closed to VCIB 111. Then, VCIB 111 may notify ADK 200 (ADS 202) that trunk door 170 has fully been opened or closed so that ADS 202 may quit output of the trunk operate command.

As set forth above, in this embodiment, while at least the doors of the rear seats are unlocked, base vehicle 100 (body system 126) accepts the trunk operate command (control command) from ADK 200 (ADS 202). Unless the doors of the rear seats are unlocked, base vehicle 100 (body system 126) does not accept the trunk operate command (control command). By accepting the trunk operate command (control command) while at least the doors of the rear seats are unlocked, opening and closing of trunk door 170 at timing unexpected by the user of vehicle 10 can be suppressed.

When base vehicle 100 (body system 126) keeps receiving the trunk operate command (control command) indicating "Open/Close Request" for one second, it starts the action of trunk door 170 (opening and closing apparatus 175). By setting continued reception of "Open/Close Request" for one second as the condition for the action of trunk door 170, an unintended action of trunk door 170 due to noise or the like can be suppressed. A duration of reception of "Open/Close Request" as the condition for the action of trunk door 170 is not limited to one second but can also be set as appropriate. The duration of reception of "Open/Close Request" may be set to a time period shorter than or equal to or longer than one second.

When base vehicle 100 (body system 126) activates again trunk door 170 after suspension thereof, it controls opening and closing apparatus 175 such that trunk door 170 takes an action (a reverse action) reverse to the action before suspension. When the action of trunk door 170 is suspended, an action reverse thereto is highly likely to be desired as a next action. By controlling trunk door 170 to perform a reverse operation after suspension, convenience of the user can be enhanced.

EXAMPLE

API Specification for TOYOTA Vehicle Platform

Ver. 1.1

Records of Revision

| Date of Revision | ver. | Overview of Revision | Reviser |
|---|---|---|---|
| May 23, 2020 | 1.0 | Creating a new material | TOYOTA MOTOR Corp. |
| Apr. 14, 2021 | 1.1 | The figure of Front Wheel Steer Angle Rate Limitation is updated. Explanation of Standstill Status is added. | TOYOTA MOTOR Corp. |

Table of Contents

1. Introduction
    1.1. Purpose of this Specification
    1.2. Target Vehicle
    1.3. Definition of Term
2. Structure
    2.1. Overall Structure of Autono-MaaS Vehicle
    2.2. System Structure of Autono-MaaS Vehicle
3. Application Interfaces
    3.1. Typical Usage of APIs
    3.2. APIs for Vehicle Motion Control
        3.2.1. API List for Vehicle Motion Control
        3.2.2. Details of Each API for Vehicle Motion Control
    3.3. APIs for BODY Control
        3.3.1. API List for BODY Control
        3.3.2. Details of Each API for BODY Control
    3.4. APIs for Power Control
        3.4.1. API List for Power Control
        3.4.2. Details of Each API for Power Control
    3.5. APIs for Failure Notification
        3.5.1. API List for Failure Notification
        3.5.2. Details of Each API for Failure Notification
    3.6. APIs for Security
        3.6.1. API List for Security
        3.6.2. Details of Each API for Security
4. API Guides to Control Toyota Vehicles
    4.1. APIs for Vehicle Motion Control
        4.1.1. API List for Vehicle Motion Control
        4.1.2. API Guides in Details for Vehicle Motion Control
    4.2. APIs for BODY Control
        4.2.1. API List for BODY Control
    4.3. APIs for Power Control
        4.3.1. API List for Power Control
    4.4. APIs for Failure Notification
        4.4.1. API List for Failure Notification
    4.5. APIs for Security
        4.5.1. API List for Security
        4.5.2. API Guides in Details for Security 1. Introduction 1.1. Purpose of this Specification This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. Structure 2.1. Overall Structure of Autono-MaaS Vehicle

Figure 7:
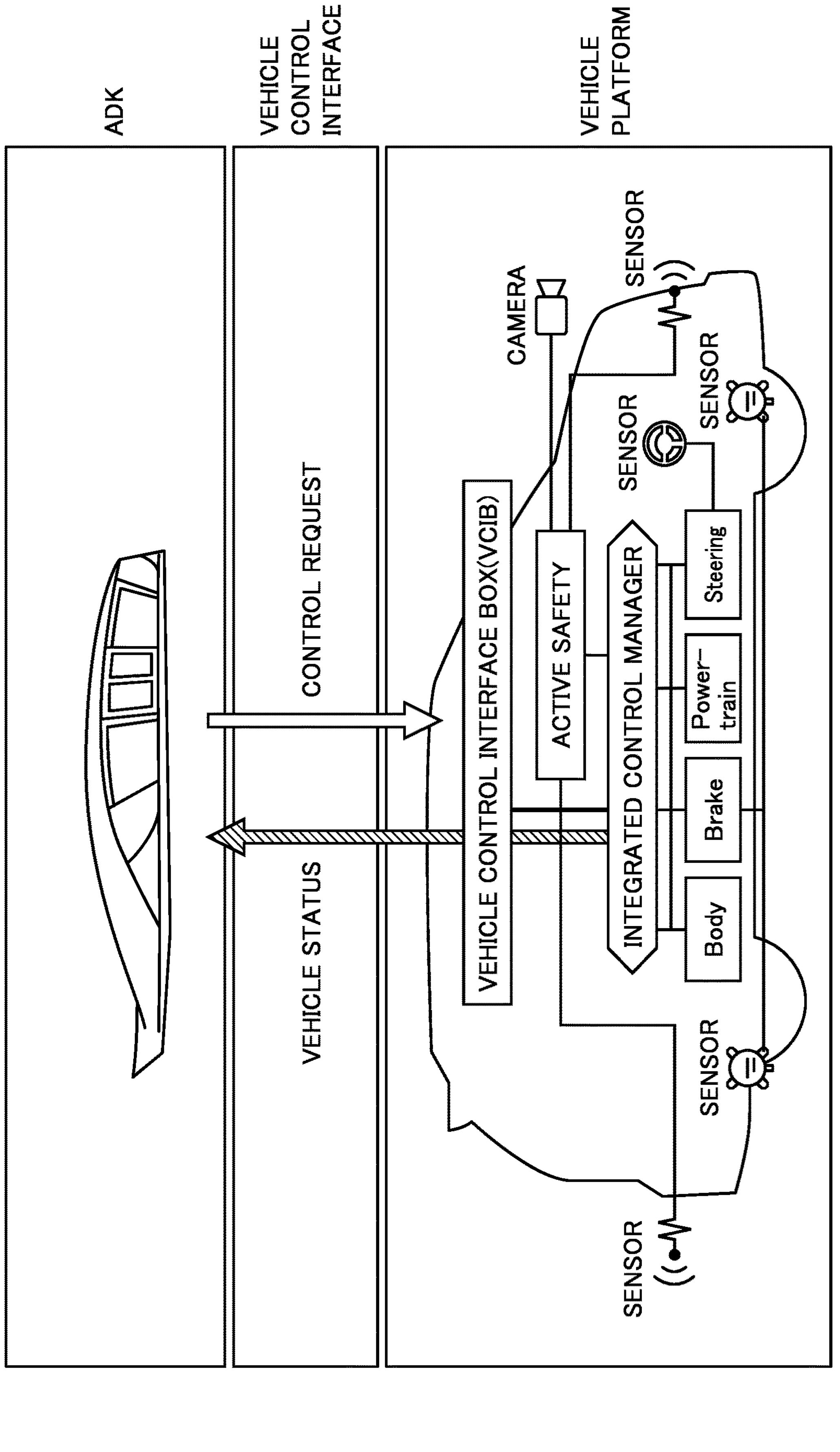
FIG. 7 is a diagram showing an overall structure of an Autono-MaaS vehicle.

The overall structure of Autono-MaaS is shown (FIG. 7).

2.2. System Structure of Autono-MaaS Vehicle

Figure 8:
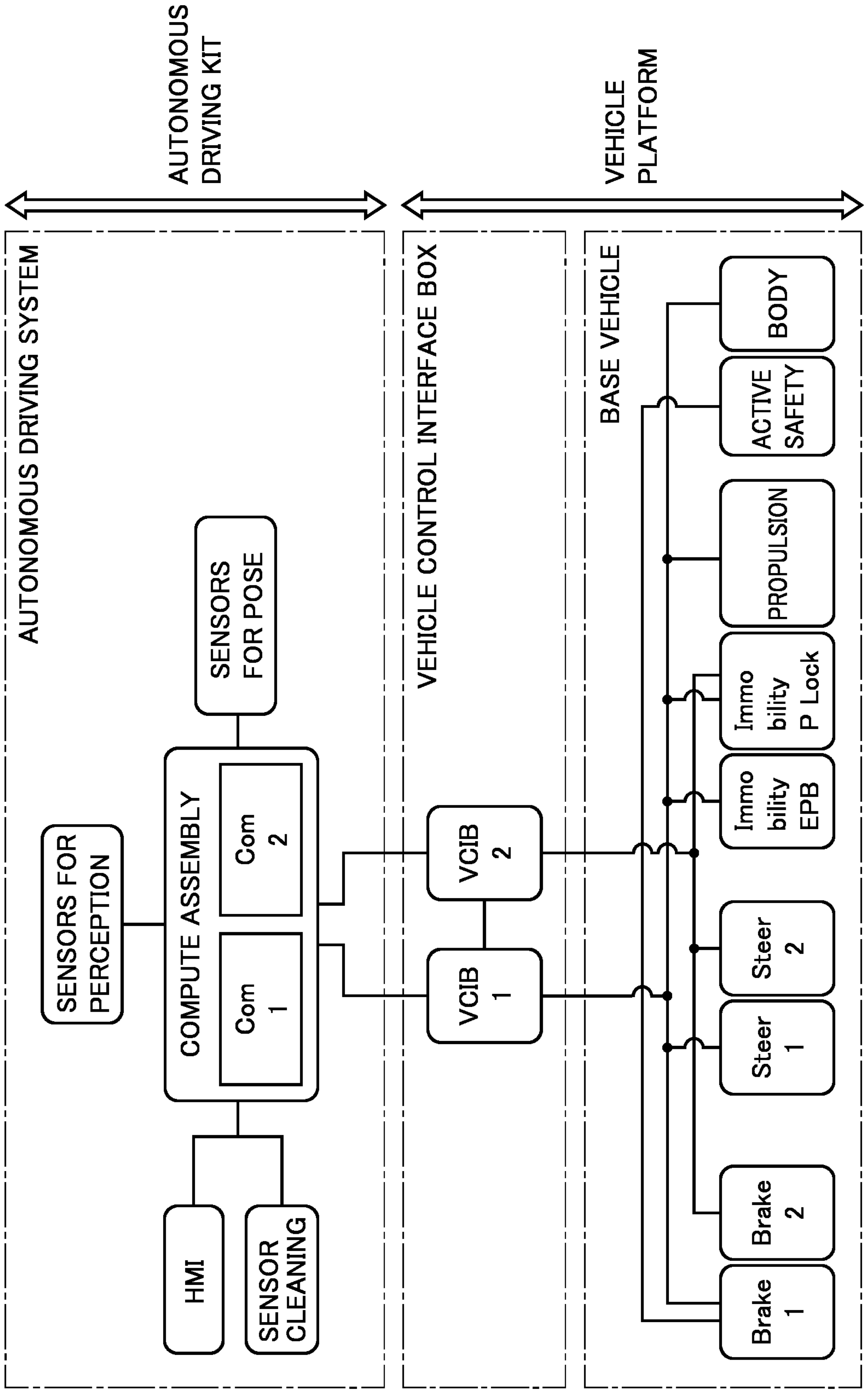
FIG. 8 is a diagram showing a system architecture of the Autono-MaaS vehicle.

System Architecture is shown in FIG. 8.

3. Application Interfaces 3.1. Typical Usage of APIs

In this section, Typical Usage of APIs is described.

A typical workflow of APIs is as follows (FIG. 9). The following example assumes CAN for physical communication.

3.2. APIs for Vehicle Motion Control

In this section, the APIs for vehicle motion control are described.

3.2.1. API List for Vehicle Motion Control 3.2.1.1. Inputs

TABLE 3

Input APIs for vehicle motion control

| Signal Name | Description | Redundancy |
|---|---|---|
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK 3.2.1.2. Outputs

TABLE 4

Output APIs for vehicle motion control

| Signal Name | Description | Redundancy |
|---|---|---|
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control 3.2.2.1. Propulsion Direction Command Request for Shift Change from/to Forward (D Range) to/from Back (R Range)

Values

| Value | Description | Remarks |
|---|---|---|
| 0 | No Request | |
| 2 | R | Shift to R range |
| 4 | D | Shift to D range |
| other | Reserved | |

Remarks

- Available only when Vehicle mode state="Autonomous Mode."
- Available only when a vehicle is stationary (Traveling direction="standstill").
- Available only when brake is applied.

3.2.2.2. Immobilization Command

Request for turning on/off WheelLock

Values

The following table shows a case where EPB and Shift P are used for immobilization.

| Value | Description | Remarks |
|---|---|---|
| 0 | No Request | |
| 1 | Applied | EPB is turned on and shift position is changed to "P" |
| 2 | Released | EPB is turned off and shift position is changed to the value of Propulsion Direction Command |

Remarks

- This API is used for parking a vehicle.
- Available only when Vehicle mode state="Autonomous Mode."
- Changeable only when the vehicle is stationary (Traveling direction="standstill").
- Changeable only while brake is applied.

3.2.2.3. Standstill Command

Request for applying/releasing brake holding function

Values

| Value | Description | Remarks |
|---|---|---|
| 0 | No Request | |
| 1 | Applied | Brake holding function is allowed. |
| 2 | Released | |

Remarks

- This API is used for choosing a status of whether the brake holding function is allowed.
- Available only when Vehicle mode state="Autonomous Mode."
- Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks

- Available only when Vehicle mode state="Autonomous Mode."
- Acceleration (+) and deceleration (−) request based on Propulsion Direction Status direction.
- The upper/lower limit will vary based on Estimated maximum deceleration and Estimated maximum acceleration.
- When acceleration more than Estimated maximum acceleration is requested, the request is set to Estimated maximum acceleration.
- When deceleration more than Estimated maximum deceleration is requested, the request is set to Estimated maximum deceleration.
- In case where a driver operates a vehicle (over-ride), the requested acceleration may not be achieved.
- When PCS simultaneously works, VP should choose minimum acceleration (maximum deceleration).

3.2.2.5. Front Wheel Steer Angle Command

Values

| Value | Description | Remarks |
|---|---|---|
| — | [unit: rad] | |

Remarks

- Available only when Vehicle mode state="Autonomous Mode"
- Left is positive value (+). Right is negative value (−).
- Front wheel steer angle is set to value (0) when the vehicle is going straight.
- This request is set as a relative value from the current one to prevent misalignment of "Front Wheel Steer Angle" from being accumulated.
- The request value should be set within Front wheel steer angle rate limitation.
- In case where a driver operates a vehicle (over-ride), the requested Front Wheel Steer Angle may not be achieved.

3.2.2.6. Vehicle Mode Command

Request for changing from/to manual mode to/from Autonomous Mode

Values

| Value | Description | Remarks |
|---|---|---|
| 0 | No Request | |
| 1 | Request For Autonomy | |
| 2 | Deactivation Request | means transition request to manual mode |

Remarks

N/A 3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks

N/A 3.2.2.8. Propulsion Direction Status

Current shift Status

Value

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks

If VP does not know the current shift status, this output is set to "Invalid Value."

3.2.2.9. Immobilization Status

Each immobilization system status

Values

The following table shows a case where EPB and Shift P are used for immobilization.

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A 3.2.2.10. Standstill Status

Status of Standstill

Values

| Value | Description | Remarks |
|---|---|---|
| 0 | Released | |
| 1 | Applied | |
| 2 | Reserved | |
| 3 | Invalid value | |

Remarks

N/A 3.2.2.11. Estimated Gliding Acceleration

Acceleration calculated in VP in case that throttle is closed, considering slope, road load and etc.

Values

[unit: $m/s^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: $m/s^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: $m/s^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate

Front wheel steer angle rate

Values

| Value | Description | Remarks |
|---|---|---|
| Minimum Value | Invalid value | |
| others | [unit: rad/s] | |

Remarks

Left is positive value (+). Right is negative value (−).

This signal should show invalid value until VP can calculate correct value or when Front wheel steer angle shows the minimum value.

3.2.2.16. Front Wheel Steer Angle Rate Limitation

The limit of the Front wheel steer angle rate

Values

[unit: rad/s]

Remarks

Figure 10:
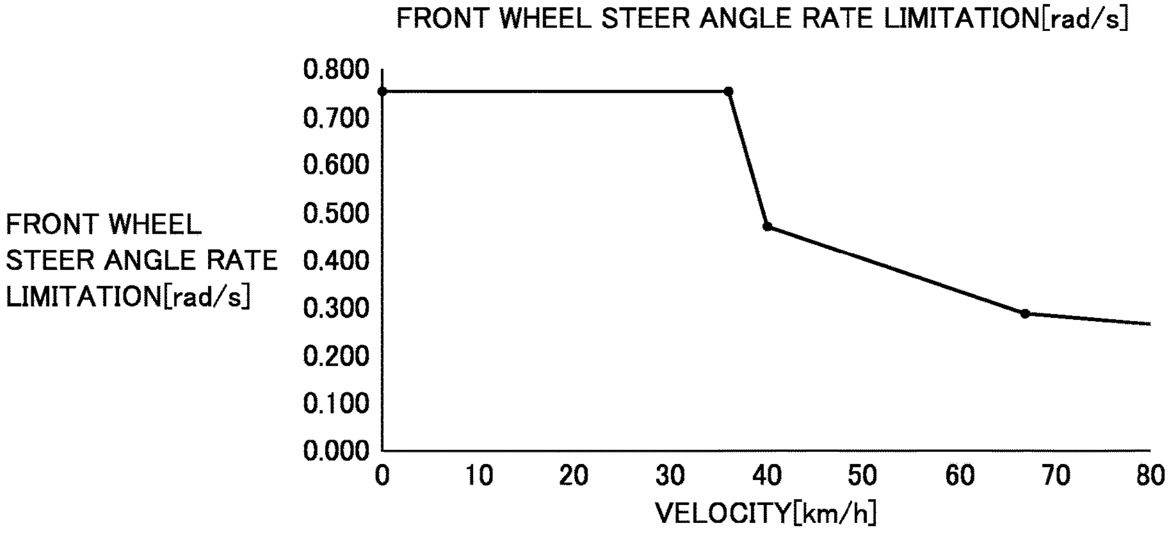
FIG. 10 is a diagram showing relation between a front wheel steer angle rate limitation and a velocity.

The limitation is calculated from the "vehicle speed—steering angle rate" map as shown in following Table 5 and FIG. 10.

A) At a low speed or stopped situation, use fixed value (0.751 [rad/s]).

B) At a higher speed, the steering angle rate is calculated from the vehicle speed using 3.432 $m/s^3$.

TABLE 5

| "vehicle speed-steering angle rate" map | | | | | |
|---|---|---|---|---|---|
| Velocity [km/h] | 0.0 | 36.0 | 40.0 | 67.0 | 84.0 |
| Front Wheel Steer Angle Rate Limitation [rad/s] | 0.751 | 0.751 | 0.469 | 0.287 | 0.253 |

3.2.2.17. Estimated Maximum Lateral Acceleration

Values

[unit: $m/s^2$](fixed value: 3.432)

Remarks

Maximum lateral acceleration defined for VP.

3.2.2.18. Estimated Maximum Lateral Acceleration Rate

Values

[unit: $m/s^3$](fixed value: 3.432)

Remarks

Maximum lateral acceleration rate defined for VP.

3.2.2.19. Intervention of Accelerator Pedal

This signal shows whether the accelerator pedal is depressed by a driver (intervention).

Values

| Value | Description | Remarks |
|---|---|---|
| 0 | Not depressed | |
| 1 | depressed | |
| 2 | Beyond autonomy acceleration | |

Remarks

When a position of accelerator pedal is higher than a defined threshold, this signal is set to "depressed".

When the requested acceleration calculated from a position of accelerator pedal is higher than the requested acceleration from ADS, this signal is set as "Beyond autonomy acceleration."

3.2.2.20. Intervention of Brake Pedal

This signal shows whether the brake pedal is depressed by a driver (intervention).

Values

| Value | Description | Remarks |
|---|---|---|
| 0 | Not depressed | |
| 1 | depressed | |
| 2 | Beyond autonomy deceleration | |

Remarks

When a position of brake pedal is higher than the defined threshold value, this signal is set to "depressed".

When the requested deceleration calculated from a position of brake pedal is higher than the requested deceleration from ADS, this signal is set as "Beyond autonomy deceleration".

3.2.2.21. Intervention of Steering Wheel

This signal shows whether the steering wheel is operated by a driver (intervention).

| Value | Description | Remarks |
|---|---|---|
| 0 | Not turned | |
| 1 | ADS and driver collaboratively work | |
| 2 | Only by human driver | |

Remarks

In "Intervention of steering wheel=1", considering the human driver's intent, EPS system drives the steering with the Human driver collaboratively.

In "Intervention of steering wheel=2", considering the human driver's intent, the steering request from ADS is not achieved. (The steering will be driven by human driver.)

3.2.2.22. Intervention of Shift Lever

This signal shows whether the shift lever is controlled by a driver (intervention)

Values

| Value | Description | Remarks |
|---|---|---|
| 0 | OFF | |
| 1 | ON | Controlled (moved to any shift position) |

Remarks

N/A 3.2.2.23. Wheel Speed Pulse (Front Left), Wheel Speed Pulse (Front Right), Wheel Speed Pulse (Rear Left), Wheel Speed Pulse (Rear Right)

Values

| Value | Description | Remarks |
|---|---|---|
| Maximum Value in transmission bits | Invalid value | The sensor is invalid. |
| others | ticks [unit: –] | The number of pulses per one round wheel depends on VP. |

Remarks

A pulse value is integrated at the pulse falling timing.

This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

Values

| Value | Description | Remarks |
|---|---|---|
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving direction of vehicle

Values

| Value | Description | Remarks |
|---|---|---|
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated longitudinal velocity of vehicle

Values

| Value | Description | Remarks |
|---|---|---|
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration

Estimated longitudinal acceleration of vehicle

Values

| Value | Description | Remarks |
|---|---|---|
| Minimum Value in transmission bits | Invalid value | The sensor is invalid. |
| others | Acceleration [unit: $m/s^2$] | |

Remarks

Acceleration (+) and deceleration (−) value based on Propulsion Direction Status direction.

3.2.2.28. Lateral Acceleration lateral acceleration of vehicle

Values

| Value | Description | Remarks |
|---|---|---|
| Minimum Value in transmission bits | Invalid value | The sensor is invalid. |
| others | Acceleration [unit: $m/s^2$] | |

Remarks

A positive value shows counterclockwise. A negative value shows clockwise.

3.2.2.29. Yaw Rate

Sensor value of yaw rate

Values

| Value | Description | Remarks |
|---|---|---|
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of tire glide/spin/skid

Values

| Value | Description | Remarks |
|---|---|---|
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle Mode State

Autonomous or manual mode

Values

| Value | Description | Remarks |
|---|---|---|
| 0 | Manual Mode | The mode starts from Manual mode. |
| 1 | Autonomous Mode | |

Remarks

The initial state is set to "Manual Mode."

3.2.2.32. Readiness for Autonomization

This signal shows whether a vehicle can change to Autonomous Mode or not

Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks

N/A 3.2.2.33. Failure Status of VP Functions for Autonomous Mode

This signal is used to show whether VP functions have some failures mode when a vehicle works as Autonomous Mode.

Values

| Value | Description | Remarks |
|---|---|---|
| 0 | No fault | |
| 1 | Fault | |
| 3 | Invalid | The status is not determined yet. |

Remarks

N/A 3.2.2.34. PCS Alert Status

Values

| Value | Description | Remarks |
|---|---|---|
| 0 | Normal | |
| 1 | Alert | Request alert from PCS system |
| 3 | Unavailable | |

Remarks

N/A 3.2.2.35. PCS Preparation Status

Prefill Status as the preparation of PCS Brake

Values

| Value | Description | Remarks |
|---|---|---|
| 0 | Normal | |
| 1 | Active | |
| 3 | Unavailable | |

Remarks

"Active" is a status in which PCS prepares brake actuator to shorten the latency from a deceleration request issued by PCS.

When a value turns to "Active" during Vehicle mode state="Autonomous Mode," "ADS/PCS arbitration status" shows "ADS".

3.2.2.36. PCS Brake/PCS Brake Hold Status

Values

| Value | Description | Remarks |
|---|---|---|
| 0 | Normal | |
| 1 | PCS Brake | |
| 2 | PCS Brake Hold | |
| 7 | Unavailable | |

Remarks

N/A 3.2.2.37. ADS/PCS Arbitration Status

Arbitration status

Values

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS".

When acceleration requested by PCS system in VP is larger than one requested by ADS, the status is set as "ADS".

3.3. APIs for BODY Control 3.3.1. API List for BODY control 3.3.1.1. Inputs

TABLE 6

Input APIs for BODY Control

| Signal Name | Description | Redundancy |
|---|---|---|
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
|---|---|---|
| Turnsignal status | Status of the current turnsignallight mode of the vehicle platform | N/A |
| Headlight status | Status of the current headlight mode of the vehicle platform | N/A |
| Hazardlight status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the 1$^{st}$ row HVAC | N/A |
| HVAC (2nd row) status | Status of activation of the 2$^{nd}$ row HVAC | N/A |
| Target temperature (1st left) status | Status of set temperature of 1$^{st}$ row left | N/A |
| Target temperature (1st right) status | Status of set temperature of 1$^{st}$ row right | N/A |
| Target temperature (2nd left) status | Status of set temperature of 2$^{nd}$ row left | N/A |
| Target temperature (2nd right) status | Status of set temperature of $^{2nd}$ row right | N/A |
| HVAC fan (1st row) status | Status of set fan level of 1$^{st}$ row | N/A |
| HVAC fan (2nd row) status | Status of set fan level of 2$^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control 3.3.2.1. Turnsignal command

Request to control turn-signal

Values

| Value | Description | Remarks |
|---|---|---|
| 0 | OFF | |
| 1 | Right | Right blinker ON |
| 2 | Left | Left blinker ON |
| 3 | Reserved | |

Remarks

N/A 3.3.2.2. Headlight Command

Request to control headlight

Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks

This command is valid when headlight mode on the combination switch="OFF" or "Auto mode=ON."

Driver operation overrides this command.

3.3.2.3. Hazardlight Command

Request to control hazardlight

Values

| Value | Description | Remarks |
|---|---|---|
| 0 | No Request | |
| 1 | ON | |

Remarks

Driver operation overrides this command.

Hazardlight is ON while receiving "ON" command.

3.3.2.4. Horn Pattern Command

Request to choose a pattern of ON-time and OFF-time per cycle

Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks

N/A 3.3.2.5. Horn Cycle Command

Request to choose the number of ON and OFF cycles

Values 0 to 7 [-]

Remarks

N/A 3.3.2.6. Continuous Horn Command

Request to turn on/off horn

Values

| Value | Description | Remarks |
|---|---|---|
| 0 | No request | |
| 1 | ON | |

Remarks

This command's priority is higher than 3.3.2.4 Horn pattern and 3.3.2.5 Horn cycle command.

Horn is "ON" while receiving "ON" command.

3.3.2.7. Front Windshield Wiper Command

Request to control front windshield wiper

Values

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6,7 | Reserved | |

Remarks

This command is valid when front windshield wiper mode on a combination switch is "OFF" or "AUTO".

Driver input overrides this command.

Windshieldwiper mode is kept while receiving a command.

Wiping speed of intermittent mode is fixed.

3.3.2.8. Rear Windshield Wiper Command

Request to control rear windshield wiper

Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks

Driver input overrides this command

Windshieldwiper mode is kept while receiving a command.

Wiping speed of intermittent mode is fixed.

3.3.2.9. HVAC (1st Row) Operation Command

Request to start/stop 1st row air conditioning control

Values

| Value | Description | Remarks |
|---|---|---|
| 0 | No request | |
| 1 | ON | |
| 2 | OFF | |

Remarks

N/A 3.3.2.10. HVAC (2nd Row) Operation Command

Request to start/stop 2nd row air conditioning control

Values

| Value | Description | Remarks |
|---|---|---|
| 0 | No request | |
| 1 | ON | |
| 2 | OFF | |

Remarks

N/A 3.3.2.11. Target Temperature (1st Left) Command

Request to set target temperature in front left area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.12. Target Temperature (1st Right) Command

Request to set target temperature in front right area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.13. Target Temperature (2nd Left) Command

Request to set target temperature in rear left area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.14. Target Temperature (2nd Right) Command

Request to set target temperature in rear right area

Values

| Value | Description | Remarks |
|---|---|---|
| 0 | No request | |
| 60 to 85 [unit: ° F.] (by 1.0° F.) | Target temperature | |

Remarks

In case ° C. is used in VP, value should be set as ° C.

3.3.2.15. HVAC Fan (1st Row) Command

Request to set fan level of front AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (1st row) operation command=OFF."

If you would like to turn the fan level to AUTO, you should transmit "HVAC (1st row) operation command=ON."

3.3.2.16. HVAC Fan (2nd Row) Command

Request to set fan level of rear AC

Values

| Value | Description | Remarks |
|---|---|---|
| 0 | No request | |
| 1 to 7 (Maximum) | Fan level | |

Remarks

If you would like to turn the fan level to 0 (OFF), you should transmit "HVAC (2nd row) operation command=OFF."

If you would like to turn the fan level to AUTO, you should transmit "HVAC (2nd row) operation command=ON."

3.3.2.17. Air Outlet (1st Row) Command

Request to set 1st row air outlet mode

Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

N/A 3.3.2.18. Air Outlet (2nd Row) Command

Request to set 2nd row air outlet mode

Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks

N/A 3.3.2.19. Air Recirculation Command

Request to set air recirculation mode

Values

| Value | Description | Remarks |
|---|---|---|
| 0 | No request | |
| 1 | ON | |
| 2 | OFF | |

Remarks

N/A 3.3.2.20. AC Mode Command

Request to set AC mode

| Value | Description | Remarks |
|---|---|---|
| 0 | No request | |
| 1 | ON | |
| 2 | OFF | |

Remarks

N/A 3.3.2.21. Turnsignal Status

Values

| Value | Description | Remarks |
|---|---|---|
| 0 | OFF | |
| 1 | Left | |
| 2 | Right | |
| 3 | Invalid | |

Remarks

N/A 3.3.2.22. Headlight Status

Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks

N/A 3.3.2.23. Hazardlight Status

Values

| Value | Description | Remarks |
|---|---|---|
| 0 | OFF | |
| 1 | Hazard | |
| 2 | Reserved | |
| 3 | Invalid | |

Remarks

N/A 3.3.2.24. Horn Status

Values

| Value | Description | Remarks |
|---|---|---|
| 0 | OFF | |
| 1 | ON | |
| 2 | Reserved | |
| 3 | Invalid | |

Remarks

In the case that 3.3.2.4 the Horn Pattern Command is active, the Horn status is "1" even if there are OFF periods in some patterns.

3.3.2.25. Front Windshield Wiper Status

Values

| Value | Description | Remarks |
|---|---|---|
| 0 | OFF | |
| 1 | Lo | |
| 2 | Hi | |
| 3 | INT | |

-continued

| Value | Description | Remarks |
| --- | --- | --- |
| 4-5 | Reserved | |
| 6 | Fail | |
| 7 | Invalid | |

Remarks
N/A
3.3.2.26. Rear Windshield Wiper Status
Values

| Value | Description | Remarks |
| --- | --- | --- |
| 0 | OFF | |
| 1 | Lo | |
| 2 | Reserved | |
| 3 | INT | |
| 4-5 | Reserved | |
| 6 | Fail | |
| 7 | Invalid | |

Remarks
N/A
3.3.2.27. HVAC (1st Row) Status
Values

| Value | Description | Remarks |
| --- | --- | --- |
| 0 | OFF | |
| 1 | ON | |

Remarks
N/A
3.3.2.28. HVAC (2nd Row) Status
Values

| Value | Description | Remarks |
| --- | --- | --- |
| 0 | OFF | |
| 1 | ON | |

Remarks
N/A
3.3.2.29. Target Temperature (1st Left) Status
Values

| Value | Description | Remarks |
| --- | --- | --- |
| 0 | Lo | Max cold |
| 60 to 85 [unit: ° F.] | Target temperature | |
| 100 | Hi | Max hot |
| FFh | Unknown | |

Remarks
In case ° C. is used in VP, value should be set as ° C.
3.3.2.30. Target Temperature (1st Right) Status
Values

| Value | Description | Remarks |
| --- | --- | --- |
| 0 | Lo | Max cold |
| 60 to 85 [unit: ° F.] | Target temperature | |
| 100 | Hi | Max hot |
| FFh | Unknown | |

Remarks
In case ° C. is used in VP, value should be set as ° C.
3.3.2.31. Target Temperature (2nd Left) Status
Values

| Value | Description | Remarks |
| --- | --- | --- |
| 0 | Lo | Max cold |
| 60 to 85 [unit: °F] | Target temperature | |
| 100 | Hi | Max hot |
| FFh | Unknown | |

Remarks
In case ° C. is used in VP, value should be set as ° C.
3.3.2.32. Target Temperature (2nd Right) Status
Values

| Value | Description | Remarks |
| --- | --- | --- |
| 0 | Lo | Max cold |
| 60 to 85 [unit: °F] | Target temperature | |
| 100 | Hi | Max hot |
| FFh | Unknown | |

Remarks
In case ° C. is used in VP, value should be set as ° C.
3.3.2.33. HVAC Fan (1st Row) Status
Values

| Value | Description | Remarks |
| --- | --- | --- |
| 0 | OFF | |
| 1 to 7 | Fan Level | |
| 8 | Undefined | |

Remarks
N/A
3.3.2.34. HVAC Fan (2nd Row) Status
Values

| Value | Description | Remarks |
| --- | --- | --- |
| 0 | OFF | |
| 1 to 7 | Fan Level | |
| 8 | Undefined | |

Remarks
N/A
3.3.2.35. Air Outlet (1st Row) Status
Values

| Value | Description | Remarks |
| --- | --- | --- |
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks
N/A 3.3.2.36. Air Outlet (2nd Row) Status

Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks

N/A 3.3.2.37. Air Recirculation Status

Values

| Value | Description | Remarks |
|---|---|---|
| 0 | OFF | |
| 1 | ON | |

Remarks

N/A 3.3.2.38. AC Mode Status

Values

| Value | Description | Remarks |
|---|---|---|
| 0 | OFF | |
| 1 | ON | |

Remarks

N/A 3.3.2.39. Seat Occupancy (1st Right) Status

Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks

When there is luggage on the seat, this signal may be set as "Occupied".

3.3.2.40. Seat Belt (1st Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A 3.3.2.41. Seat Belt (1st Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks

N/A 3.3.2.42. Seat Belt (2nd Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure 3.3.2.43. Seat Belt (2nd Right) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure 3.3.2.44. Seat Belt (3rd Left) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure 3.3.2.45. Seat Belt (3rd Center) Status

Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks cannot detect sensor failure 3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
cannot detect sensor failure
3.4. APIs for Power Control
3.4.1. API List for Power control
3.4.1.1. Inputs

TABLE 8

| Input APIs for Power control | | |
|---|---|---|
| Signal Name | Description | Redundancy |
| Power mode command | Command to control the power mode of VP | N/A |

3.4.1.2. Outputs

TABLE 9

| Output APIs for Power control | | |
|---|---|---|
| Signal Name | Description | Redundancy |
| Power mode status | Status of the current power mode of VP | N/A |

3.4.2. Details of Each API for Power Control
3.4.2.1. Power mode command
Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Figure 11:
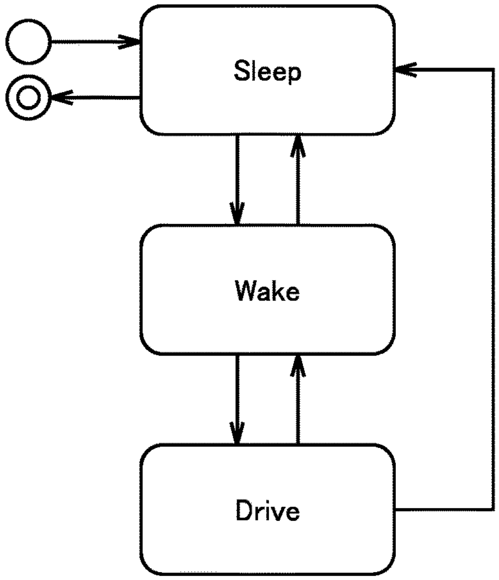
FIG. 11 is a state machine diagram of the power mode.

Remarks
The state machine diagram of the power modes is shown in FIG. 11.
[Sleep]
Vehicle power off condition. In this mode, the main battery does not supply power to each system, and neither VCIB nor other VP ECUs are activated.
[Wake]
VCIB is awake by the auxiliary battery. In this mode, ECUs other than VCIB are not awake except for some of the body electrical ECUs.
[Driving Mode]
Vehicle power on condition. In this mode, the main battery supplies power to the whole VP and all the VP ECUs including VCIB are awake.

3.4.2.2. Power Mode Status
Values

| Value | Description | Remarks |
|---|---|---|
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks
VCIB will transmit [Sleep] as Power_Mode_Status continuously for 3000 [ms] after executing the sleep sequence. And then, VCIB will shut down.
ADS should stop transmitting signals to VCIB while VCIB is transmitting [Sleep].
3.5. APIs for Failure Notification
3.5.1. API List for Failure Notification
3.5.1.1. Inputs

TABLE 10

| Input APIs for Failure Notification | | |
|---|---|---|
| Signal Name | Description | Redundancy |
| N/A | N/A | N/A |

3.5.1.2. Outputs

TABLE 11

| Output APIs for Failure Notification | | |
|---|---|---|
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |
| Performance deterioration of communication system | | Applied |

3.5.2. Details of Each API for Failure Notification
3.5.2.1. Request for ADS Operation
Values

| Value | Description | Remarks |
|---|---|---|
| 0 | No request | |
| 1 | Need maintenance | |
| 2 | Need to be back to garage | |
| 3 | Need to stop immediately | |
| Others | Reserved | |

Remarks
This signal shows a behavior which the ADS is expected to do according to a failure which happened in the VP.

3.5.2.2. Impact Detection Signal

Values

| Value | Description | Remarks |
|---|---|---|
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: Crash Detection>Normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
|---|---|---|
| 0 | Normal | — |
| 1 | Deterioration detected | — |

Remarks

N/A 3.5.2.4. Performance Deterioration of Propulsion System

Values

| Value | Description | Remarks |
|---|---|---|
| 0 | Normal | — |
| 1 | Deterioration detected | — |

Remarks

N/A 3.5.2.5. Performance Deterioration of Shift Control System

Values

| Value | Description | Remarks |
|---|---|---|
| 0 | Normal | — |
| 1 | Deterioration detected | — |

Remarks

N/A 3.5.2.6. Performance Deterioration of Immobilization System

Values

| Value | Description | Remarks |
|---|---|---|
| 0 | Normal | — |
| 1 | Deterioration detected | — |

Remarks

N/A 3.5.2.7. Performance Deterioration of Steering System

Values

| Value | Description | Remarks |
|---|---|---|
| 0 | Normal | — |
| 1 | Deterioration detected | — |

Remarks

N/A 3.5.2.8. Performance Deterioration of Power Supply System

Values

| Value | Description | Remarks |
|---|---|---|
| 0 | Normal | — |
| 1 | Deterioration detected | — |

Remarks

N/A 3.5.2.9. Performance Deterioration of Communication System

Values

| Value | Description | Remarks |
|---|---|---|
| 0 | Normal | — |
| 1 | Deterioration detected | — |

Remarks

N/A 3.6. APIs for Security 3.6.1. API List for Security 3.6.1.1. Inputs

TABLE 12

Input APIs for Security

| Signal Name | Description | Redundancy |
|---|---|---|
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |

TABLE 12-continued

Input APIs for Security

| Signal Name | Description | Redundancy |
|---|---|---|
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

Output APIs for Security

| Signal Name | Description | Redundancy |
|---|---|---|
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security 3.6.2.1. Door Lock (front) command, Door Lock (rear) command Values

| Value | Description | Remarks |
|---|---|---|
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central door lock command

Request to control all doors' lock

Values

| Value | Description | Remarks |
|---|---|---|
| 0 | No Request | |
| 1 | Lock (all) | |
| 2 | Unlock (all) | |
| 3 | Reserved | |

Remarks

N/A 3.6.2.3. Device Authentication Signature the 1st word, Device Authentication Signature the 2nd word, Device Authentication Signature the 3rd word, Device Authentication Signature the 4th word, Device Authentication Seed the 1st word, Device Authentication Seed the 2nd word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.5. Door Lock (1st Right) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.6. Door Lock (2nd Left) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.7. Door Lock (2nd Right) Status

Values

| Value | Description | Remarks |
|---|---|---|
| 0 | Reserved | |
| 1 | Locked | |
| 2 | Unlocked | |
| 3 | Invalid | |

Remarks

N/A 3.6.2.8. Door Lock Status of all Doors

Values

| Value | Description | Remarks |
|---|---|---|
| 0 | Reserved | |
| 1 | All Locked | |
| 2 | Anything Unlocked | |
| 3 | Invalid | |

Remarks

In case any doors are unlocked, "Anything Unlocked."

In case all doors are locked, "All Locked."

3.6.2.9. Alarm System Status

Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks

N/A 3.6.2.9.1. Trip Counter

This counter is incremented in a unit of trips by the Freshness Value management master ECU.

Values

0—FFFFh

Remarks

This value is used to create a Freshness value.

For details, please refer to the other material [the specification of Toyota's MAC module].

3.6.2.9.2. Reset Counter

This counter is incremented periodically by the Freshness Value management master ECU.

Values

0—FFFFFh

Remarks

This value is used to create a Freshness value.

For details, please refer to the other material [the specification of Toyota's MAC module].

3.6.2.10. 1st Left Door Open Status

Status of the current 1st-left door open/close of the vehicle platform

Values

| Value | Description | Remarks |
|---|---|---|
| 0 | Reserved | |
| 1 | Open | |
| 2 | Closes | |
| 3 | Invalid | |

Remarks

N/A 3.6.2.11. 1st Right Door Open Status

Status of the current 1st-right door open/close

Values

| Value | Description | Remarks |
|---|---|---|
| 0 | Reserved | |
| 1 | Open | |
| 2 | Close | |
| 3 | Invalid | |

Remarks

N/A 3.6.2.12. 2nd Left Door Open Status

Status of the current 2nd-left door open/close

Values

| Value | Description | Remarks |
|---|---|---|
| 0 | Reserved | |
| 1 | Open | |
| 2 | Close | |
| 3 | Invalid | |

Remarks

N/A 3.6.2.13. 2nd Right Door Open Status

Status of the current 2nd-right door open/close

Values

| Value | Description | Remarks |
|---|---|---|
| 0 | Reserved | |
| 1 | Open | |
| 2 | Close | |
| 3 | Invalid | |

Remarks

N/A 3.6.2.14. Trunk Status

Status of the current trunk door open/close

Values

| Value | Description | Remarks |
|---|---|---|
| 0 | Reserved | |
| 1 | Open | |

-continued

| Value | Description | Remarks |
|---|---|---|
| 2 | Close | |
| 3 | Invalid | |

Remarks

N/A 3.6.2.15. Hood Open Status

Status of the current hood open/close

Values

| Value | Description | Remarks |
|---|---|---|
| 0 | Reserved | |
| 1 | Open | |
| 2 | Close | |
| 3 | Invalid | |

Remarks

N/A

4. API Guides to Control Toyota Vehicles

This section shows in detail the way of using APIs for Toyota vehicles.

4.1. APIs for Vehicle Motion Control 4.1.1. API List for Vehicle Motion Control

Input and output APIs for vehicle motion control are shown in Table 14 and Table 15, respectively. Usage guides of some APIs are presented in the following sections as indicated in each table.

4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1<br>4.1.2.2<br>4.1.2.3<br>4.1.2.4 |
| Front Wheel Steer Angle Command | Request for front wheel steer angle | Applied | 4.1.2.5 |
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK 4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e.g. EPB and Shift P) | Applied | 4.1.2.2<br>4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1<br>4.1.2.3 |

TABLE 15-continued

| Output APIs for Vehicle Motion Control | | | |
|---|---|---|---|
| Signal Name | Description | Redundancy | Usage Guide |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API Guides in Details for Vehicle Motion Control 4.1.2.1. Propulsion Direction Command Please refer to 3.2.2.1 for value and remarks in detail.

Figure 12:
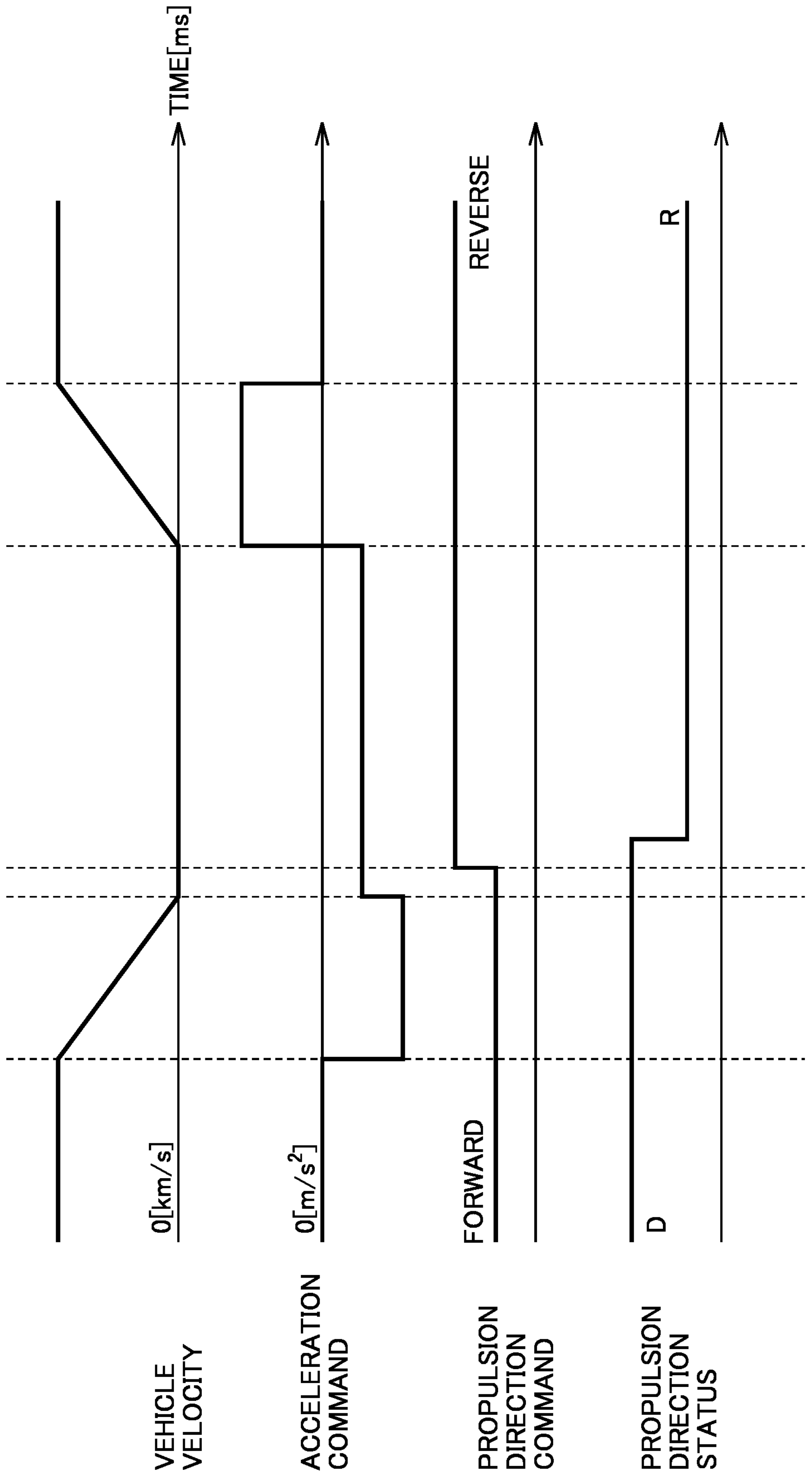
FIG. 12 is a diagram showing details of shift change sequences.

FIG. 12 shows shift change sequences in detail.

Figure 13:
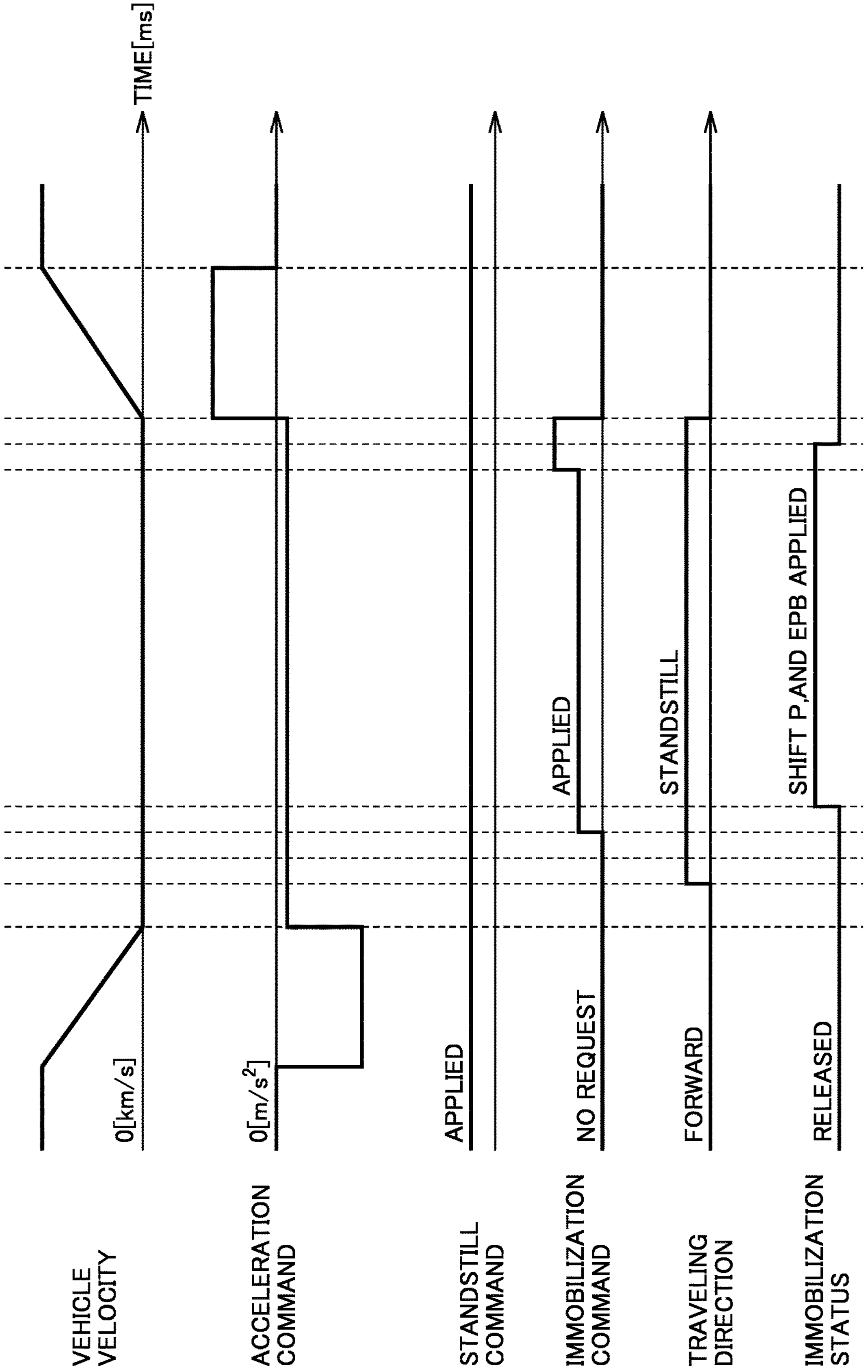
FIG. 13 is a diagram showing immobilization sequences.

First deceleration is requested by Acceleration Command and the vehicle is stopped. When Traveling direction is set to "standstill", any shift position can be requested by Propulsion Direction Command. (In FIG. 13, "D"→"R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 14:
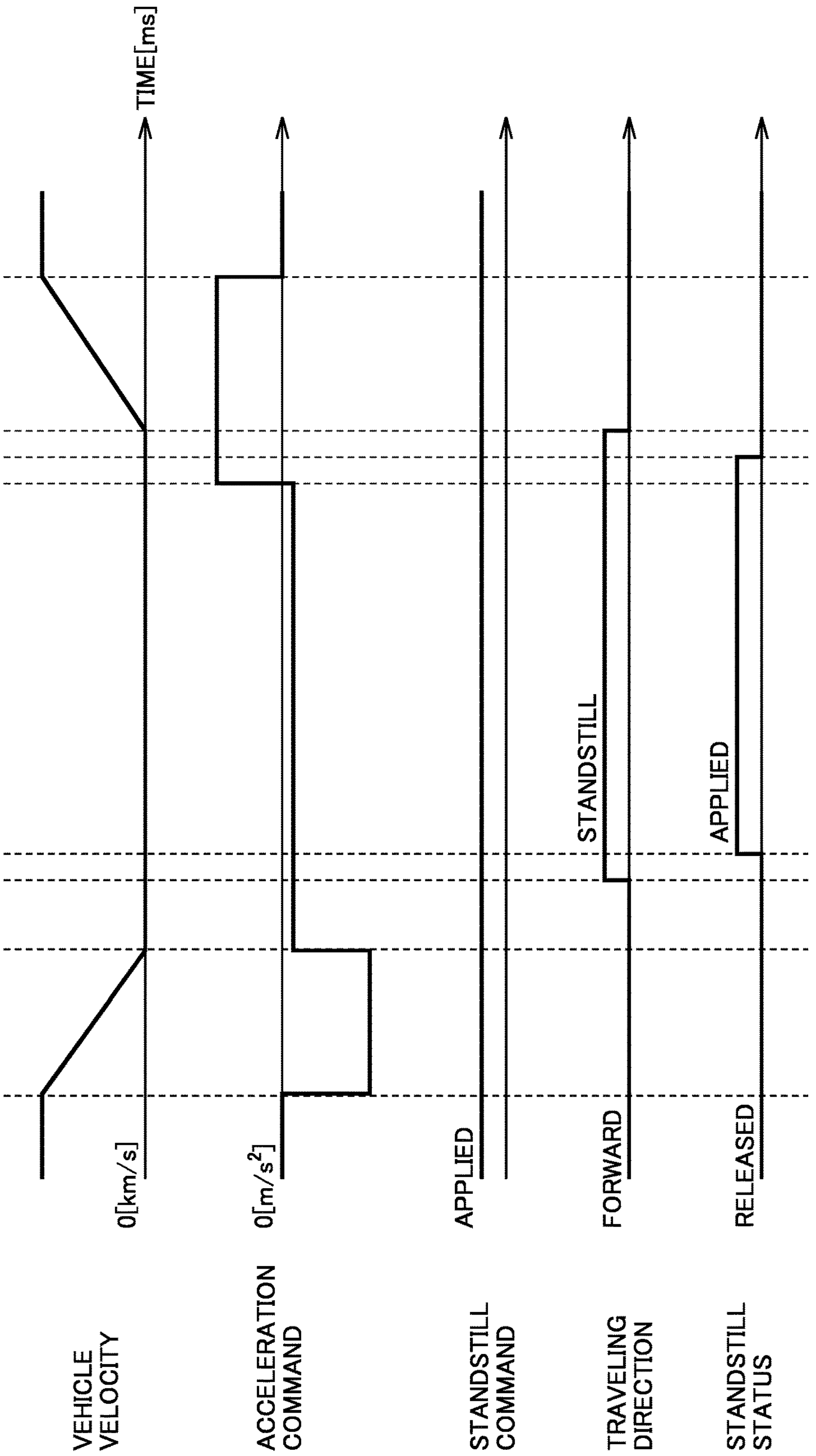
FIG. 14 is a diagram showing standstill sequences.

FIG. 14 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied". On the other hand, in case where Standstill Command is set as "Released", brakehold function is deactivated.

FIG. 14 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 15:
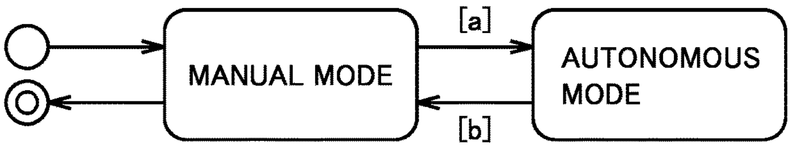
FIG. 15 is a state machine diagram of an autonomy state.

The state machine of mode transition for Autono-MaaS vehicle is shown in FIG. 15.

The explanation of each state is shown as follows.

| State | Description |
|---|---|
| Manual | A vehicle begins with this state and is under a control of a human driver.<br>ADK cannot give any controls (except some commands) to VP.<br>Power mode status and Vehicle mode state are in the followings:<br>Power mode status = Wake or Drive<br>Vehicle mode state = Manual Mode |
| Autonomy | ADK can communicate to VP after authentication is successful.<br>VP is under the control of the ADK as a result of being issued "Request for Autonomy."<br>Power mode status and Vehicle mode state are in the followings:<br>Power mode status = Drive<br>Vehicle mode state = Autonomous Mode |

The explanation of each transition is shown as follows.

| Transition | Conditions |
|---|---|
| a | When the following conditions are established, the mode will be transitioned from Manual to Autonomy:<br>The ADK is authenticated,<br>Power mode status = Drive,<br>Readiness for autonomization = Ready For Autonomy<br>Vehicle Mode Command = Request For Autonomy. |
| b | When the following conditions are established, the mode will be transitioned from Autonomy to Manual:<br>Vehicle Mode Command = Deactivation Request. |

4.2. APIs for BODY Control 4.2.1. API List for BODY Control 4.2.1.1. Inputs

TABLE 16

Input APIs for BODY Control

| Signal Name | Description | Redundancy | Usage Guide |
|---|---|---|---|
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |

TABLE 16-continued

| Input APIs for BODY Control | | | |
|---|---|---|---|
| Signal Name | Description | Redundancy | Usage Guide |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

| Output APIs for BODY Control | | | |
|---|---|---|---|
| Signal Name | Description | Redundancy | Usage Guide |
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the 1st row HVAC | N/A | — |
| HVAC (2nd row) status | Status of activation of the 2nd row HVAC | N/A | — |
| Target temperature (1st left) status | Status of set temperature of 1st row left | N/A | — |
| Target temperature (1st right) status | Status of set temperature of 1st row right | N/A | — |
| Target temperature (2nd left) status | Status of set temperature of 2nd row left | N/A | — |
| Target temperature (2nd right) status | Status of set temperature of 2nd row right | N/A | — |
| HVAC fan (1st row) status | Status of set fan level of 1st row | N/A | — |
| HVAC fan (2nd row) status | Status of set fan level of 2nd row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control
4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification
4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | | Applied | — |
| Performance deterioration of Power supply system | | Applied | — |
| Performance deterioration of Communication system | | Applied | — |

4.5. APIs for Security
4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |

TABLE 23-continued

Output APIs for Security

| Signal Name | Description | Redundancy | Usage Guide |
|---|---|---|---|
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API guides in Details for Security 4.5.2.1. Device Authentication Protocol Device authentication is applied when the VCIB is activated from “Sleep” mode.

After the authentication succeeds, the VCIB can start to communicate with ADK.

Figure 16:
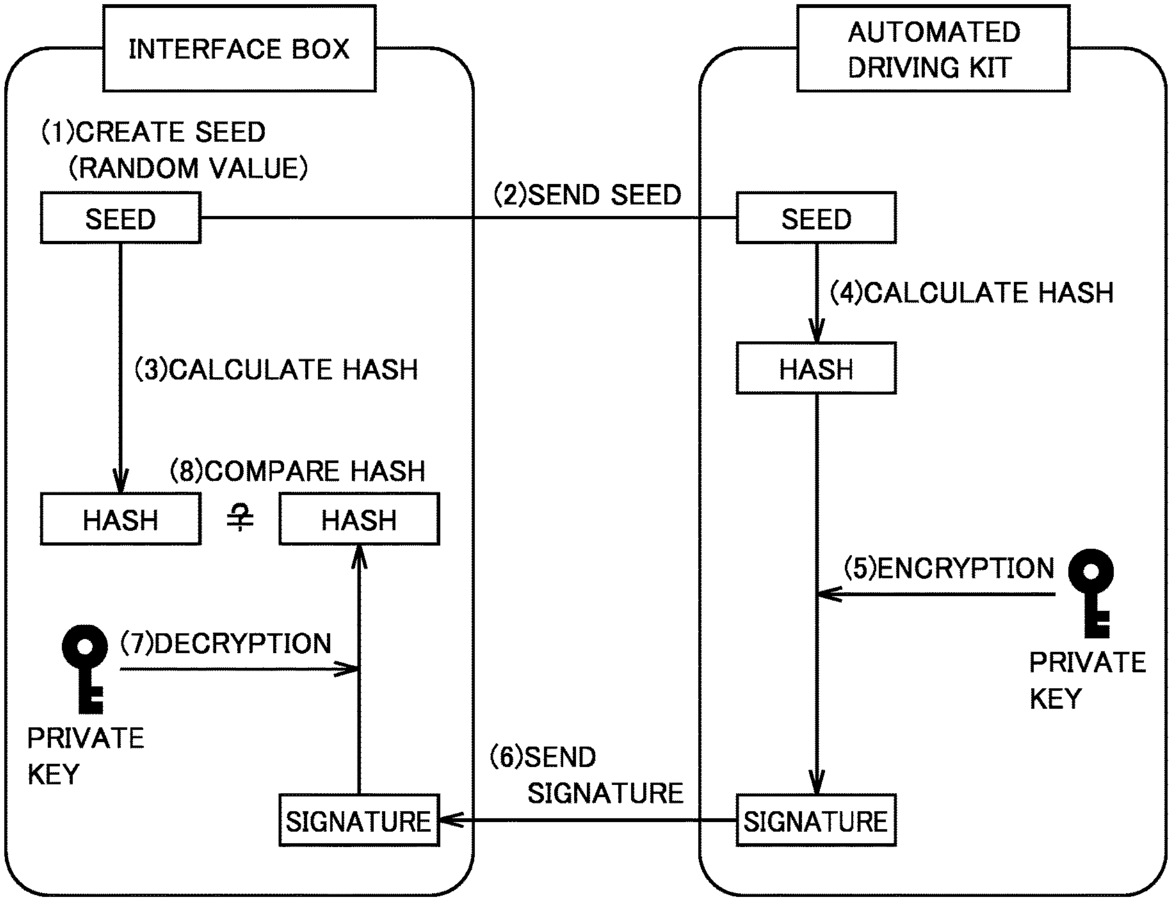
FIG. 16 is a diagram showing an authentication process.

Authentication process is as shown in FIG. 16 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle platform on which an autonomous driving system is mountable, the vehicle platform comprising:
- a vehicle; and
- a vehicle control interface box that interfaces between the vehicle and the autonomous driving system, wherein
- the vehicle includes an entrance door, an entrance door of a rear seat, and a trunk door, and
- while the entrance door is unlocked, the vehicle accepts a trunk operate command that requests an action of the trunk door received by the vehicle control interface box from the autonomous driving system, and
- while the entrance door of the rear seat is locked, the vehicle does not accept the trunk operate command that requests an action of the trunk door received by the vehicle control interface box from the autonomous driving system.

2. The vehicle platform according to claim 1, wherein
- the trunk operate command includes a first request that requests an opening/closing action of the trunk door, and
- when the vehicle keeps accepting the first request for one second, the vehicle activates the trunk door.

3. The vehicle platform according to claim 2, wherein
- the trunk operate command includes a second request that indicates No request, and
- when the vehicle accepts the second request while the trunk door is in action, the vehicle allows a continued action of the trunk door.

4. The vehicle platform according to claim 3, wherein
- when the vehicle accepts the first request after the vehicle accepts the second request while the trunk door is in action, the vehicle stops the action of the trunk door.

5. The vehicle platform according to claim 4, wherein
- when the vehicle stops the action of the trunk door and then when the vehicle activates again the trunk door in accordance with the trunk operate command, the vehicle controls the trunk door to take an action reverse to the action before stop.

6. A vehicle platform comprising:
- an autonomous driving system that creates a driving plan;
- a vehicle that carries out vehicle control in accordance with a command from the autonomous driving system; and
- a vehicle control interface box that interfaces between the vehicle and the autonomous driving system, wherein
- the vehicle includes an entrance door, an entrance door of a rear seat, and a trunk door, and
- while the entrance door is unlocked, the vehicle accepts a trunk operate command that requests an action of the trunk door received by the vehicle control interface box from the autonomous driving system, and while the entrance door of the rear seat is locked, the vehicle does not accept the trunk operate command that requests an action of the trunk door received by the vehicle control interface box from the autonomous driving system.

7. The vehicle platform according to claim 6, wherein the trunk operate command includes a first request that requests an opening/closing action of the trunk door, and when the vehicle keeps accepting the first request for one second, the vehicle activates the trunk door.

8. The vehicle platform according to claim 7, wherein the autonomous driving system transmits the first request until the trunk door is fully opened or closed.

9. The vehicle platform according to claim 7, wherein the trunk operate command includes a second request that indicates No request, and when the vehicle accepts the second request while the trunk door is in action, the vehicle allows a continued action of the trunk door.

10. The vehicle platform according to claim 9, wherein when the vehicle accepts the first request after the vehicle accepts the second request while the trunk door is in action, the vehicle stops the action of the trunk door.

11. The vehicle platform according to claim 10, wherein when the vehicle stops the action of the trunk door and then when the vehicle activates again the trunk door in accordance with the trunk operate command, the vehicle controls the trunk door to take an action reverse to the action before stop.

* * * * *